(12) United States Patent
Trimble et al.

(10) Patent No.: US 8,914,582 B1
(45) Date of Patent: Dec. 16, 2014

(54) SYSTEMS AND METHODS FOR PINNING CONTENT IN CACHE

(71) Applicant: Google Inc., Mountain View, CA (US)

(72) Inventors: Troy Trimble, Mountain View, CA (US); Justin Christopher Haugh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/677,005

(22) Filed: Nov. 14, 2012

Related U.S. Application Data

(60) Provisional application No. 61/559,691, filed on Nov. 14, 2011.

(51) Int. Cl.
*G06F 12/00* (2006.01)

(52) U.S. Cl.
USPC ........... 711/136; 711/103; 711/104; 711/118; 711/133

(58) Field of Classification Search
None
See application file for complete search history.

(56) References Cited

U.S. PATENT DOCUMENTS 7,877,482 B1 * 1/2011 Ashcraft et al. ............... 709/226
8,005,950 B1 * 8/2011 Ashcraft et al. ............... 709/224

* cited by examiner

*Primary Examiner* — Shawn X Gu
(74) *Attorney, Agent, or Firm* — Birch, Stewart, Kolasch & Birch, LLP

(57) ABSTRACT

An application server maintains a first plurality of applications in non-volatile memory. The application server loads into volatile memory a subset of the first plurality of applications. The subset is a second plurality of applications. The application server receives a request to execute an application that is not currently loaded in volatile memory, and in response performs a set of operations: (1) determining that there is inadequate storage space in volatile memory to store the application; (2) identifying at least one application in the second plurality of applications that is designated as exempt from eviction from volatile memory; (3) selecting from among the second plurality of applications an eviction target, where the selection process excludes the designed applications; (4) evicting from volatile memory the eviction target; and (5) loading and executing the application in response to the received request, and returning a result responsive to the received request.

32 Claims, 16 Drawing Sheets

SYSTEMS AND METHODS FOR PINNING CONTENT IN CACHE

PRIORITY

The present Application claims benefit of priority to U.S. Provisional Application No. 61/559,691, filed in the United States Patent and Trademark Office on Nov. 14, 2011, the entire contents of which are hereby incorporated by reference.

TECHNICAL FIELD

The disclosed embodiments relate generally to methods and systems, sometimes called application servers, for hosting and executing large numbers of heterogeneous applications, and more specifically to provide fast access to certain applications.

BACKGROUND

In general, increases in an application's popularity can present a variety of problems that negatively impact a user's experience. For example, users could experience slower response times, slower page loading, and increased timeouts on page requests.

SUMMARY

An application server has one or more processors, volatile memory, and non-volatile memory. A method of operating the application server maintains a first plurality of applications in non-volatile memory. The method loads into the volatile memory a subset of the first plurality of applications. The subset is a second plurality of applications. The method receives a first request to execute a first respective application that is not currently loaded in the volatile memory, and in response performs a set of operations: (1) determining that there is inadequate storage space in the volatile memory to store the first respective application; (2) identifying one or more applications in the second plurality of applications that are designated as exempt from eviction from volatile memory; (3) selecting from among the second plurality of applications an eviction target, where the selection process excludes the one or more designed applications; (4) evicting from the volatile memory the eviction target; and (5) loading and executing the first respective application in response to the first received request, and returning a result responsive to the first received request.

According to some embodiments, an application server system has memory, one or more processors, and one or more programs stored in the memory. The programs are configured for execution by the one or more processors. The programs include instruction for maintaining a first plurality of applications in non-volatile memory and instructions for loading into the volatile memory a subset of the first plurality of applications. The subset is a second plurality of applications. The programs include instructions for receiving a first request to execute a first respective application that is not currently loaded in the volatile memory, and to respond to the first request. To respond to the request, the programs include (1) instructions for determining that there is inadequate storage space in the volatile memory to store the first respective application; (2) instructions for identifying one or more applications in the second plurality of applications that are designated as exempt from eviction from volatile memory; (3) instructions for selecting from among the second plurality of applications an eviction target (which excludes the one or more designed applications); (4) instructions for evicting from the volatile memory the eviction target; and (5) instructions for loading and executing the first respective application in response to the first received request, and returning a result responsive to the first received request.

According to some embodiments, a non-transitory computer readable storage medium stores one or more programs to be executed by a computer system. The programs include instruction for maintaining a first plurality of applications in non-volatile memory and instructions for loading into the volatile memory a subset of the first plurality of applications. The subset is a second plurality of applications. The programs include instructions for receiving a first request to execute a first respective application that is not currently loaded in the volatile memory, and to respond to the first request. To respond to the request, the programs include (1) instructions for determining that there is inadequate storage space in the volatile memory to store the first respective application; (2) instructions for identifying one or more applications in the second plurality of applications that are designated as exempt from eviction from volatile memory; (3) instructions for selecting from among the second plurality of applications an eviction target (which excludes the one or more designed applications); (4) instructions for evicting from the volatile memory the eviction target; and (5) instructions for loading and executing the first respective application in response to the first received request, and returning a result responsive to the first received request.

According to some embodiments, a method of operating a plurality of application servers and an application master in an application execution system includes storing a plurality of applications in a library for distribution among the application servers. The method also includes associating with each respective application a respective minimum cached instances requirement that specifies how many instances of the respective application should be exempt from cache eviction. The method includes distributing applications from the library to the application servers for storage in the non-volatile memory of the application servers and monitoring the application servers to generate usage information for each of the applications in the library for a predefined period of time ending at a current time. The method also includes removing previously distributed applications from the non-volatile memory of respective application servers in accordance with the usage information. The distributing includes distributing each application to a respective number of the application servers determined by the application master in accordance with the usage information and the minimum cached instances requirement for each application, and allocating instances of the application that are exempt from cache eviction among the application servers. At each application server of the plurality of application servers, the method includes storing in non-volatile memory the applications distributed to the application server. When a respective application has an allocated minimum cached instances requirement greater than zero, the application server loads an instance of the respective application into volatile memory and designates the instance as exempt from cache eviction. When a respective application has an allocated minimum cached instances requirement equal to zero, the application server loads the respective application into volatile memory, executes the respective application in response to a received request, and returns a result responsive to the request. After returning a responsive result, the application server conditionally retains the respective application in volatile memory, for responding to a future request, when criteria, including at least predefined usage level criteria, are met by the respective application, and otherwise removing the respective application from volatile memory upon returning the result responsive to the request.

According to some embodiments, an application execution system includes a plurality of application servers, with each application server including non-volatile storage for storing a plurality of applications, volatile storage, and computational resources for executing in response to requests received by the application execution system. The application execution system also includes an application master that stores a plurality of applications in a library for distribution among the application servers. One or more programs in the application master include instructions for storing a plurality of applications in a library for distribution among the application servers. The programs also include instructions for associating with each respective application a respective minimum cached instances requirement that specifies a number of instances of the respective application that are exempt from cache eviction. The programs include instructions for distributing applications from the library to the application servers for storage in the non-volatile memory of the application servers and instructions for monitoring the application servers to generate usage information for each of the applications in the library for a predefined period of time ending at a current time. The programs also include instructions for removing previously distributed applications from the non-volatile memory of respective application servers in accordance with the usage information. The instructions for distributing includes instructions for distributing each application to a respective number of the application servers determined by the application master in accordance with the usage information and the minimum cached instances requirement for each application, and allocating instances of the application that are exempt from cache eviction among the application servers. A respective application server of the plurality of application servers has one or more programs that include instructions for storing in non-volatile memory the applications distributed to the application server. The programs include instructions for determining when a respective application has an allocated minimum cached instances requirement greater than zero, and corresponding instructions for loading an instance of the respective application into volatile memory and designating the instance as exempt from cache eviction. The programs also include instructions for determining when a respective application has an allocated minimum cached instances requirement equal to zero, and corresponding instructions for loading the respective application into volatile memory, executing the respective application in response to a received request, and returning a result responsive to the request. The programs also include instructions that conditionally retain the respective application in volatile memory, for responding to a future request, when criteria, including at least predefined usage level criteria, are met by the respective application, and otherwise removing the respective application from volatile memory upon returning the result responsive to the request.

Embodiments discussed herein may pertain to a method of operating an application server having one or more processors, volatile memory, and non-volatile memory, the method comprising: receiving a first request to execute a first application that is not currently loaded in the volatile memory of the application server, said first application being one of a first plurality of applications stored in the non-volatile memory of the application server; determining, in response to said receiving, that there is inadequate storage space in the volatile memory to store the first application; selecting from among a second plurality of applications stored in the volatile memory, an eviction target said selecting including determining whether any of said second plurality of applications are indicated as pinned to a cache, and in response to a determination that an application from among said second plurality of applications is indicated as pinned to the cache, excluding that application from selection as the eviction target; evicting from the volatile memory the eviction target; and loading and executing the first respective application in response to the first received request, and returning a result responsive to the first received request.

In some embodiments, selecting an eviction target is in accordance with a cache eviction policy. In some embodiments, the cache eviction policy includes a least-recently-used eviction policy. In some embodiments, only least recently used applications that are not pinned to the cache are eligible to be an eviction target. In some embodiments, the cache eviction policy includes a least-frequently-used eviction policy. In some embodiments, only least frequently used applications that are not pinned to the cache are eligible to be an eviction target.

Some embodiments may include steps of conditionally retaining the first application in the volatile memory, for responding to a future request, when criteria, including at least predefined usage level criteria, are met by the first application, and otherwise removing the first application from volatile memory upon returning the result responsive to the request.

In some embodiments, each of the first plurality of applications comprises an executable application distributed to the server by an application master. In some embodiments, the method includes steps of receiving a second request to execute a second application that is exempt from eviction from volatile memory, and in response: determining that the second application is in volatile memory; and executing the second application, and returning a result responsive to the second received request.

Embodiments discussed herein may pertain to an application server system, comprising: a processor-readable memory; and one or more processors; the memory including instructions that, when executed by the processors, cause the processor to perform a method of operating an application server having one or more processors, volatile memory, and non-volatile memory, the method comprising one or more of the method embodiments discussed above or herein.

Embodiments discussed herein may pertain to a non-transitory computer readable storage medium having instructions embodied thereon which, when executed by one or more processors, cause the processors to perform a method of operating an application server having one or more processors, volatile memory, and non-volatile memory, the method comprising one or more of the method embodiments discussed above or herein.

Embodiments discussed herein may pertain to a method of operating a plurality of application servers and an application master in an application execution system, the method comprising: at the application master: storing a plurality of applications in a library for distribution among the application servers; associating with each respective application a respective minimum cached instances requirement that specifies a number of instances of the respective application that are exempt from cache eviction; distributing applications from the library to the application servers for storage in the non-volatile memory of the application servers; monitoring the application servers to generate usage information for each of the applications in the library for a predefined period of time ending at a current time; and removing previously distributed applications from the non-volatile memory of respective application servers in accordance with the usage information; wherein the distributing includes distributing a respective application to a respective number of the application servers determined by the application master in accordance with the usage information and the minimum cached instances requirement for the respective application, and allocating instances of the application that are exempt from cache eviction among the application servers; and at a respective application server of the plurality of application servers: storing in non-volatile memory the applications distributed to the application server; when a respective application has an allocated minimum cached instances requirement greater than zero, loading an instance of the respective application into volatile memory and designating the instance as exempt from cache eviction; and when a respective application has an allocated minimum cached instances requirement equal to zero: loading the respective application into volatile memory, executing the respective application in response to a received request, and returning a result responsive to the request; and conditionally retaining the respective application in volatile memory, for responding to a future request, when criteria, including at least predefined usage level criteria, are met by the respective application, and otherwise removing the respective application from volatile memory upon returning the result responsive to the request.

In some embodiments, the method may further include steps of: at the respective application server: receiving a first request to execute a first application distributed to the application server, wherein the first application is not currently loaded in the volatile memory, and in response: determining that there is inadequate storage space in the volatile memory to store the first application; selecting from among application instances in volatile memory an eviction target, wherein the selecting excludes one or more application instances designated as exempt from cache eviction; evicting from the volatile memory the eviction target; and loading and executing the first respective application in response to the first received request, and returning a result responsive to the first received request.

In some embodiments, the volatile memory of each application server is managed in accordance with a cache eviction policy. In some embodiments, the cache eviction policy includes a least-recently-used eviction policy. In some embodiments, the cache eviction policy includes a least-frequently-used eviction policy.

Embodiments discussed herein may pertain to an application execution system, comprising: a plurality of application servers, with each application server including non-volatile storage for storing a plurality of applications, volatile storage, and computational resources for executing in response to requests received by the application execution system; and an application master that stores a plurality of applications in a library for distribution among the application servers; wherein the application master includes: instructions for storing a plurality of applications in a library for distribution among the application servers; instructions for associating with each respective application a respective minimum cached instances requirement that specifies a number of instances of the respective application that are exempt from cache eviction; instructions for distributing applications from the library to the application servers for storage in the non-volatile memory of the application servers; instructions for monitoring the application servers to generate usage information for each of the applications in the library for a predefined period of time ending at a current time; and instructions for removing previously distributed applications from the non-volatile memory of respective application servers in accordance with the usage information; wherein the instructions for distributing includes instructions for distributing each application to a respective number of the application servers determined by the application master in accordance with the usage information and the minimum cached instances requirement for each application, and allocating instances of the application that are exempt from cache eviction among the application servers; and wherein a respective application server of the plurality of application servers includes: instructions for storing in non-volatile memory the applications distributed to the application server; instructions for determining when a respective application has an allocated minimum cached instances requirement greater than zero, and corresponding instructions for loading an instance of the respective application into volatile memory and designating the instance as exempt from cache eviction; and instructions for determining when a respective application has an allocated minimum cached instances requirement equal to zero, and corresponding instructions for: loading the respective application into volatile memory, executing the respective application in response to a received request, and returning a result responsive to the request; and conditionally retaining the respective application in volatile memory, for responding to a future request, when criteria, including at least predefined usage level criteria, are met by the respective application, and otherwise removing the respective application from volatile memory upon returning the result responsive to the request.

In some embodiments, the respective application server further includes: instructions for receiving a first request to execute a first application distributed to the application server, wherein the first application is not currently loaded in the volatile memory, and to respond to the first request: instructions for determining that there is inadequate storage space in the volatile memory to store the first application; instructions for selecting from among application instances in volatile memory an eviction target, wherein the instructions for selecting exclude one or more application instances designated as exempt from cache eviction; instructions for evicting from the volatile memory the eviction target; and instructions for loading and executing the first respective application in response to the first received request, and returning a result responsive to the first received request.

In some embodiments, the volatile memory of each application server is managed in accordance with a cache eviction policy. In some embodiments, the cache eviction policy includes a least-recently-used eviction policy. In some embodiments, the cache eviction policy includes a least-frequently-used eviction policy.

BRIEF DESCRIPTION OF THE DRAWINGS

Like reference numerals refer to corresponding parts throughout the several views of the drawings.

DESCRIPTION OF EMBODIMENTS

Although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of organizing, storing and indexing information (e.g., entities) so as to enable the information to be efficiently retrieved in response to search queries.

Figure 1A:
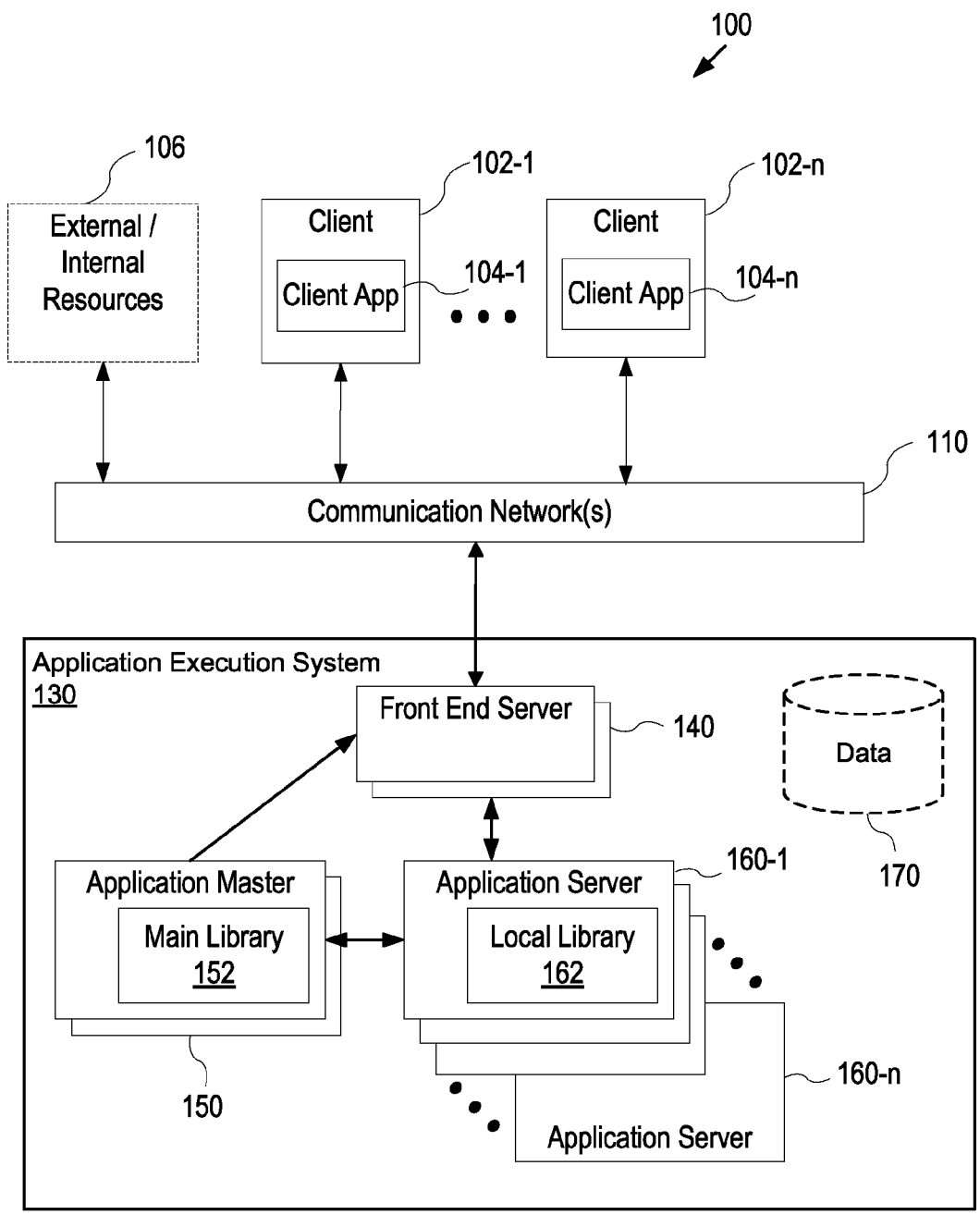
FIG. 1A is a block diagram of a distributed computing system including an application execution system, in accordance with some embodiments.

FIG. 1a is a block diagram of a distributed computing system 100 including an application execution system 130 connected to a plurality of clients 102 (e.g. 102-1 ... 102-n) through a network 110 such as the Internet, other wide area networks, local area networks, metropolitan area networks, wireless networks, or any combination of such networks. In some embodiments, a respective client 102 contains one or more client applications 104 (e.g. 104-1 ... 104-n), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 include a front-end server 140, which receives application execution requests from clients 102 and returns results to the requesting clients.

The application execution system 130 include a plurality of application servers 160 (e.g., 160-1 through 160-n). As described in more detail below with reference to FIG. 2B, each of the application servers 160 includes non-volatile storage for storing a plurality of applications in a local library 162, volatile storage, and computational resources for executing applications in response to requests received by the application execution system 130.

Figure 1B:
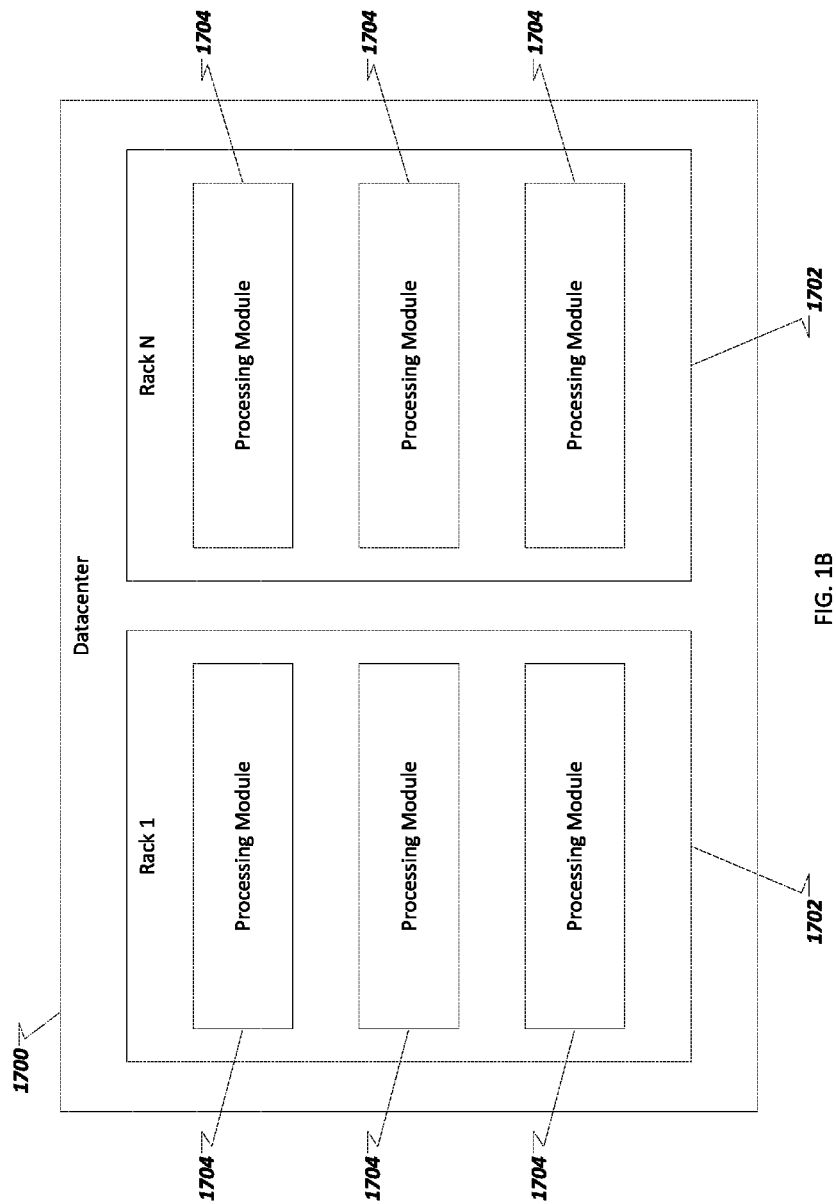
FIG. 1B is a block diagram of a data center having multiple processing modules, in accordance with some embodiments.

FIG. 1b is a block diagram illustrating an example of a datacenter (1700). The data center (1700) is used to store data, perform computational tasks, and transmit data to other systems outside of the datacenter using, for example, a network connected to the datacenter. In particular, the datacenter (1700) may perform large-scale data processing on massive amounts of data.

The datacenter (1700) includes multiple racks (1702). While only two racks are shown, the datacenter (1700) may have many more racks. Each rack (1702) can include a frame or cabinet into which components, such as processing modules (1704), are mounted. In general, each processing module (1704) can include a circuit board, such as a motherboard, on which a variety of computer-related components are mounted to perform data processing. The processing modules (1704) within each rack (1702) are interconnected to one another through, for example, a rack switch, and the racks (1702) within each datacenter (1700) are also interconnected through, for example, a datacenter switch.

A rack can include storage, like one or more network attached disks, that is shared by the one or more processing modules (1704) and/or each processing module (1704) may include its own storage. Additionally, or alternatively, there may be remote storage connected to the racks through a network. The processing module (1704) may be a computing device such as a rack computer, a server, or any other suitable form of computing device. In some embodiments, the processing module (1704) may be associated with volatile and/or non-volatile storage. Non-volatile storage may include one or more hard drive(s) or portions thereof, optical storage devices and/or media, tape storage devices and/or media, magnetic storage devices and/or media, solid-state memory, and other computer-accessible storage media and/or devices capable of storing data for later retrieval in both powered-on and powered-off states. Volatile storage may include RAM chips, memory registers, buffers, and other computer-accessible storage capable of storing data for retrieval only in a powered-on state.

The datacenter (1700) may include dedicated optical links or other dedicated communication channels, as well as supporting hardware, such as modems, bridges, routers, switches, wireless antennas and towers. The datacenter (1700) may include one or more wide area networks (WANs) as well as multiple local area networks (LANs).

A processing module (1704) may represent an application server that hosts one or more applications. An application server may have multiple applications running simultaneously thereon, and may have multiple copies or "instances" of an application running.

A data center (1700) may have multiple applications running in application servers within the data center. In some embodiments, an application server in a data center may correspond to one or more physical and/or logical processing modules (1704). In some embodiments, a logical application server may grow or shrink to occupy multiple and/or partial portions of a physical processing module (1704). In such embodiments, some or all of the processing modules (1704) in a data center may be standardized or otherwise have known physical arrangements whereas a logical application server created from one or more processing modules and/or from fragments/portions of a processing module may emulate hardware properties that are not otherwise physically present in the data center.

In some embodiments, a processing module may include a physical or logical data processor. A physical data processor may include data processing chips such as, for example, a chip having an x86 architecture or a chip having an ARM (Advanced RISC Machine) architecture. A logical data processor may include an emulator or other logical data processing entity simulating behavior of a computer processor that may or may not otherwise be present or available in the data center.

As described in more detail below with reference to FIGS. 2A and 2B, the application execution system 130 also includes an application master 150 that distributes applications, from a main library 152 having a plurality of applications, among the application servers 160. In the embodiment shown in FIG. 1, the main library 152 is stored in the application master 150. Alternately, the main library 152 may be stored remotely from the application master, such as in a data store 170. In some embodiments, each application of the plurality of applications in the main library 152 is a web application that is responsive to HTTP requests. However, some embodiments can also be used in non-web based environments, in which case the applications need not be web-based applications.

In some embodiments, the application execution system 130 may also include a data store 170 accessible to at least the application master 150 and the front-end server 140, for sharing information about the location of applications among the application servers 160 and resource usage or loading information with respect to the application servers 160.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when the is experienced over a prolonged period of time, or when the decrease is predictable. However, the popularity of an application is often unpredictable, due to a variety of factors (e.g., time of day, current events, advertising, trends), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

Attempts to dynamically allocate resources to applications can lead to a different problem. An application that is not used frequently (or recently) may be evicted from the cache on an application server using any cache eviction policy (e.g., least recently used or least frequently used). The result is that when the application is requested, there can be a substantial delay to load the desired application (e.g., 10 seconds versus less than half a second).

Figure 2A:
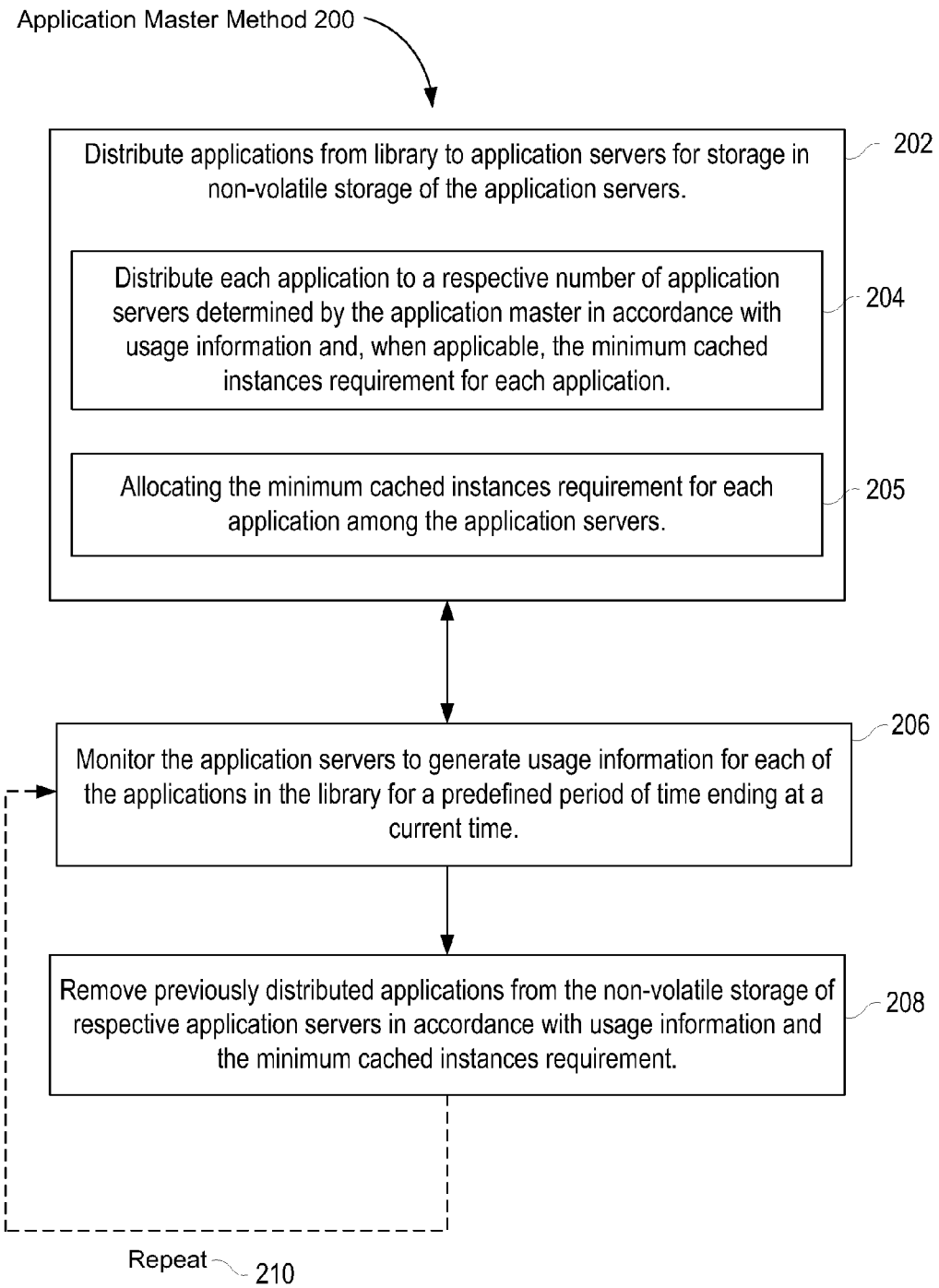
FIG. 2A is a flow diagram illustrating an exemplary method performed by an application master, in accordance with some embodiments.

FIG. 2A is a flow diagram illustrating a method 200 performed by an application master, in accordance with some embodiments. The application master distributes (202) applications from the main library 152 (FIG. 1) to the application servers 160 for storage in the non-volatile storage (i.e., local library 162) of the application servers 160. In some embodiments, a local library 162 may include one or more databases or database tables stored in a non-volatile storage medium associated with or otherwise directly accessible by the application server.

As described in more detail below with reference to FIG. 2B, each application from the library is distributed by the application master 150 to a respective number of the application servers 160 that is determined by the application master in accordance with usage information and, when applicable, the minimum cached instances requirement for each application (204). Applications in heavy use are typically distributed to more application servers than applications receiving less use. In addition, if there is a specified non-zero minimum number of cached instances for a particular application, this number of instances of the application is allocated to respective application servers, even when there is minimal usage of the application. More specifically, when there is a specified non-zero minimum number of cached instances for a particular application, the application master allocates at least the minimum number of cached instances for that application among the application servers (205). In some embodiments, when the number of instances of the application to be distributed among the application servers is equal to the specified non-zero minimum number of cached instances for the application, allocation operation 205 allocates no more than one cached instance to any individual application server.

In other embodiments, an allocation operation 205 may allocate cached instances such that, in cases where there are more cached instances than there are application servers to be used for allocation, each application server receives at least one cached instance. This maximizes the number of application servers to which the specified minimum number of cached instances are allocated, which increases reliability. In some embodiments, however, more than one cached instance or a respective application is allocated to a single application server.

The method 200 further includes monitoring (206) the application servers 160 to generate usage information for each of the applications in the library for a predefined period of time ending at a current time, and removing (208) previously distributed applications from the non-volatile storage of respective application servers 160 in accordance with the usage information and the minimum cached instances requirement. Typically, the distributing, monitoring and removing operations are repeated 210, or are ongoing, so long as the system continues to operate.

Usage information may include information an amount of processing power and memory being consumed by one or more of the applications within an application server. In some embodiments, the application master 150 may monitor and/or interrogate an application server to determine usage information for one or more applications in the application server and/or to a usage level for the application server. In some embodiments, the applications themselves may not be polled directly because they may not be trusted to report accurate usage information. In some embodiments, usage information may include CPU and memory usage. In further embodiments, usage information may also include metrics such as QPS (Queries Per Second), which represents the number of queries an application and/or an application server is handling per second. Usage information may also include an overall usage frequency of an application as well as information regarding computing resources being consumed by that application. In some embodiments, usage information may include data that relates computing resource consumption and usage frequency for an application or one or more applications in an application server.

Figure 2B:
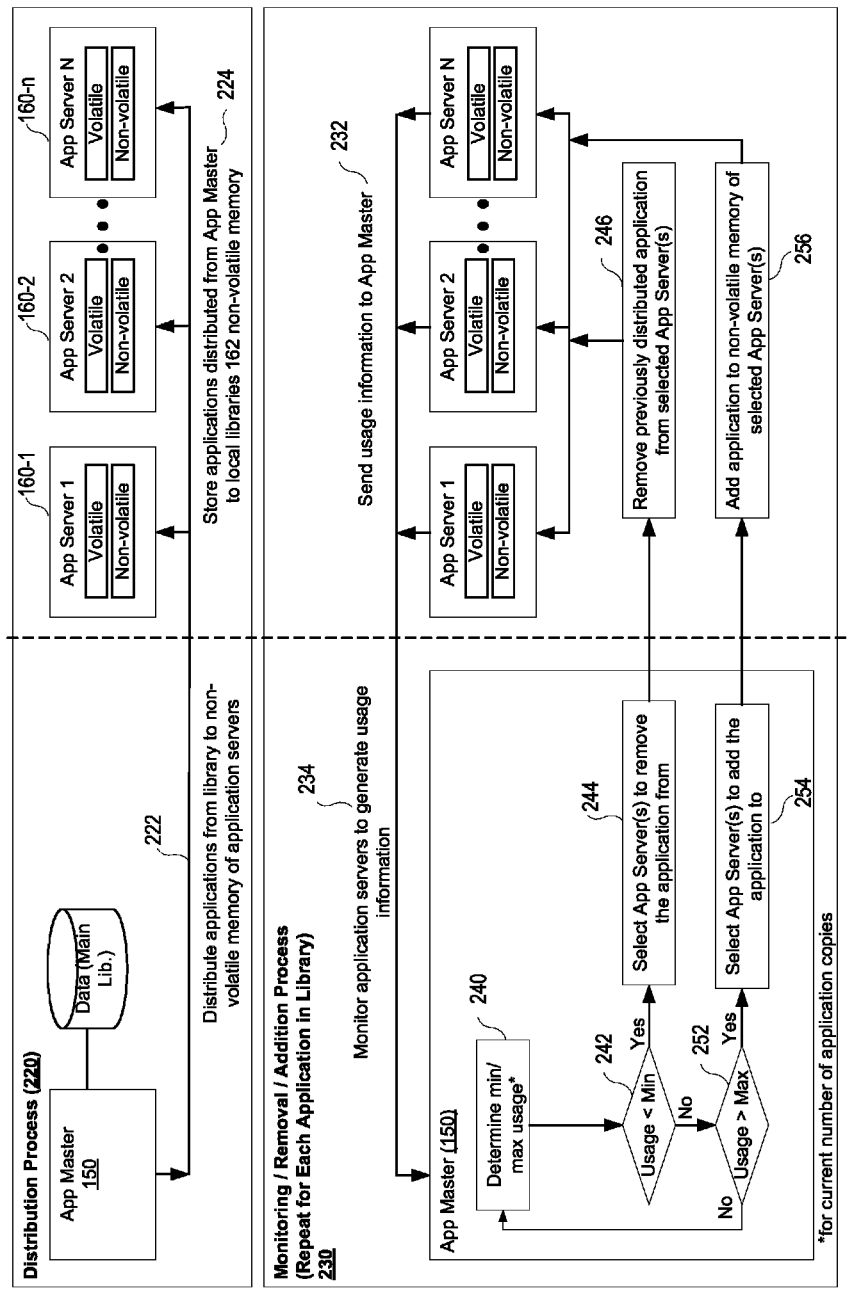
FIG. 2B is a flow diagram illustrating examples of distribution, monitoring, removal, and addition processes, in accordance with some embodiments.

FIG. 2B is a more detailed flowchart of a method 200 described above with reference to FIG. 2A. The top portion of FIG. 2B is a schematic view of a distribution process 220 in which the application master 150 distributes (222) applications from the main library 152 to application servers 160 for storage in non-volatile storage. Each of the application servers 160 stores (224) in its non-volatile storage the applications distributed to it by the application master. In some embodiments, the application master 150 distributes each application in the main library 152 to at least three of the application servers 160. The minimum number of application servers to which each application is distributed is selected in order to ensure at least a predefined minimum level of service for every application in the main library. Other embodiments may employ different application schemes based on a number of application servers 160 available to the application master 150 for a particular application.

The application servers send (232) application usage information to the application master, and the application master monitors (234) the application servers to generate usage information for each of the applications in the library for a predefined period of time. Embodiments of such usage information may include trends or measurements of resource usage during a given time period. Other embodiments of usage information may include a series of resource usage snapshots taken at certain intervals during a given time period. From the generated usage information, the application master 150 can evaluate usage of each application (e.g., frequency of usage, resources used, etc.), and can also evaluate the loading of each application server. In some embodiments, the usage information (e.g., CPU usage information 352, FIG. 3B) and information about the amount of storage available at a respective application server (e.g., server storage data 356, FIG. 3B) used by the application master to determine the load on an application server are stored in a data structure 340, described below with reference to FIG. 3B. Information about the CPU usage of a respective application (e.g., CPU usage 326, FIG. 3A), used by the application master to determine the usage level of the application, is stored in a data structure 300, described below with reference to FIG. 3A. Other embodiments may include information about QPS or other database call information of a respective application, which the application master may use instead or in addition to the above-noted measurements.

As described in more detail below, the application master 150 evaluates the usage information according to pre-defined criteria, and takes appropriate action by increasing or decreasing the number of application servers to which each application has been distributed, to ensure that sufficient resources are available to service client requests for execution of the applications. In some embodiments, the application distribution process by the application master, as applied to each application in the library, includes evaluating usage level thresholds for the application based on the number of active application servers to which the application has been distributed. For example, minimum and maximum thresholds are determined, which indicate a suitable range of application usage (over a predefined period of time) for the number of application servers on which the application is stored. Embodiments of such thresholds may be based on any or all portions of the usage information, including memory usage, CPU usage, and/or upper or lower bounds on QPS. If the usage information for a particular application indicates a usage level below the minimum usage threshold (242—Yes), the application master 150 removes the application from a selected set of the application servers (244). Upon receiving application removal instructions from the application master, the selected application servers remove the application from their non-volatile storage (246). In some embodiments, one or more usage thresholds may be established, such as a threshold for CPU usage and a threshold for memory usage. In some such embodiments, an application may be removed if it falls below both such thresholds. In other embodiments, an application may be removed if it falls below any of the one or more usage thresholds. In yet other embodiments, a usage threshold may be an aggregate or other composite measurement derived from a combination of different usage information, such as, for example, a combination of memory usage and QPS level.

If the usage level is above the maximum threshold (252—Yes), the application master 150 may distribute (254) additional copies of the application from the main library to a selected set of the application servers. In some embodiments, the application master 150 may direct an application server to activate or otherwise initiate an application instance based on application data or code stored locally at or accessible directly by the application server. The selected application servers store (256) the application or application data in their local libraries 162 (FIG. 1) in non-volatile memory. In some embodiments, while performing operations 244 and 254 the application master manages the load on a respective application server, in accordance with predefined load distribution criteria, by distributing applications to and removing applications from the non-volatile storage of the respective application server. More generally, the application master takes into account the current application execution loads on the application servers when determining the applications servers to send additional applications and the applications servers from which to remove applications. An application execution load may include information similar to that included in application usage information. In some embodiments, an application execution load may be determined based on an instantaneous snapshot of resource usage for an application at a particular time. In some embodiments, application execution load may also include information about a number of users accessing the application and/or may be determined, calculated or inferred from a QPS level.

Occasionally, application server(s) may need to be removed (or taken offline) from a cluster for repairs, routine maintenance, and other reasons. In these situations, the application master 150 may transfer load handled by the application server(s) to be removed and redistribute this load across remaining active application servers. The process of transferring load to the active servers may be rate-limited so that application servers can be safely removed after a period of time without disrupting the system.

In some embodiments, the removing of previously distributed applications from the non-volatile storage of the application servers and the distributing of applications from the library to the application servers are rate limited with respect to how many applications are removed and distributed per predefined period of time. A rate limit (e.g., a limit of N applications per unit of time) may be applied to each application server individually, or to a cluster or other group of application servers. In some embodiments, the rate limit is set small enough so that changes in the load pattern of an application server occur slowly, rather than all at once, which allows the application master to make other changes to account for the load.

Figure 3A:
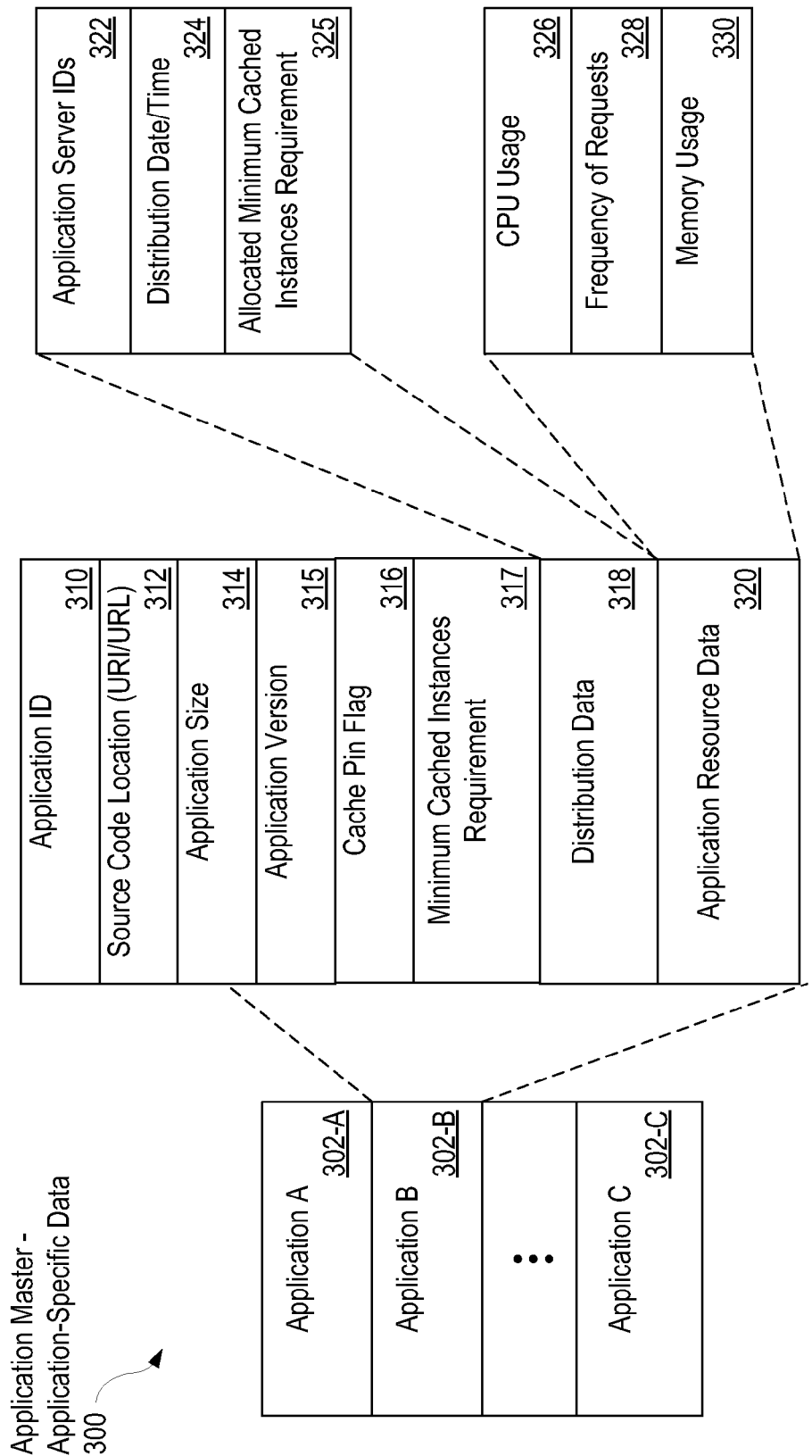
FIG. 3A represents a data structure used by an application master to store information regarding a set of applications that have been distributed to a set of application server, in accordance with some embodiments.
Figure 3B:
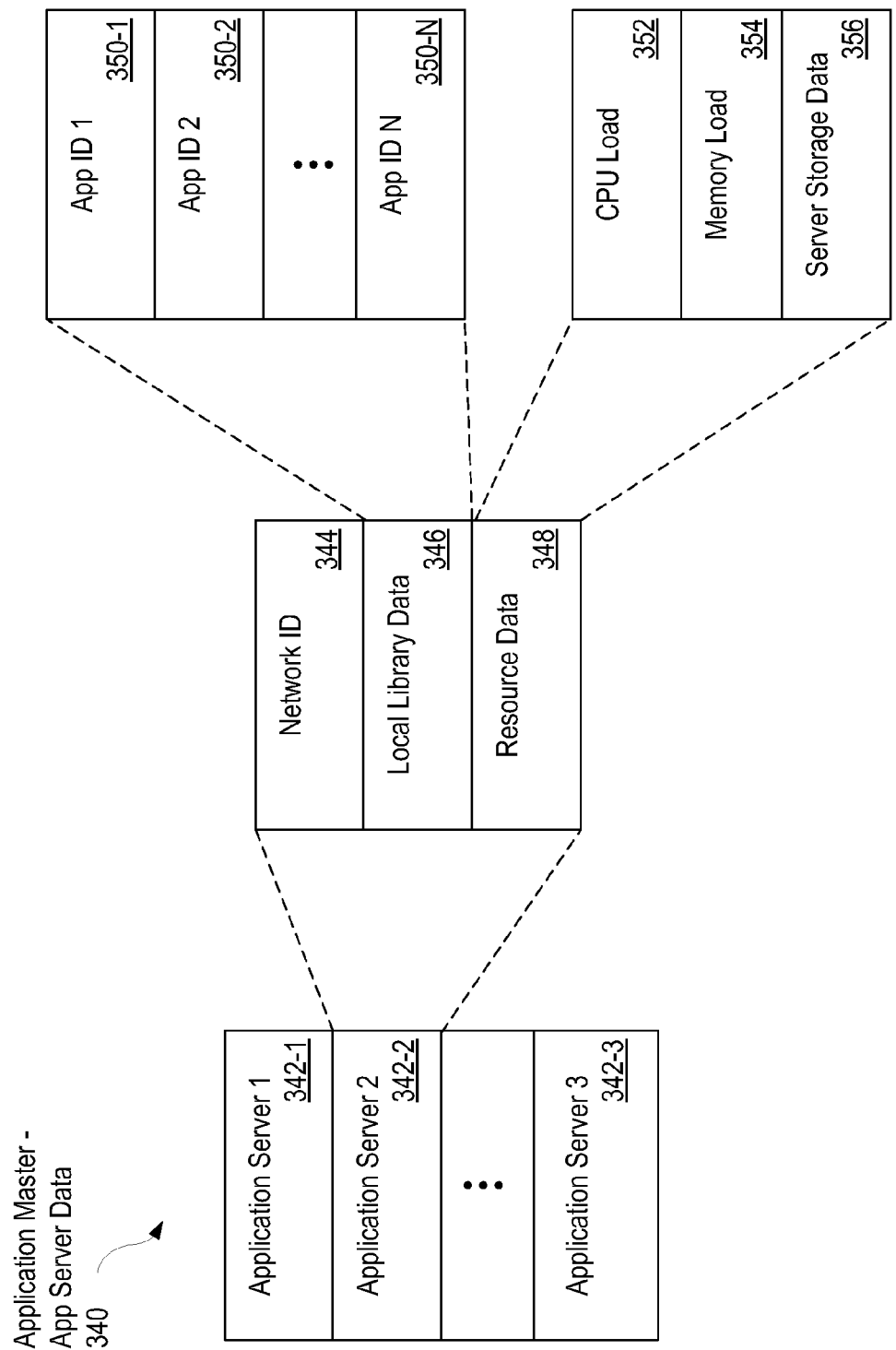
FIG. 3B illustrates a data structure used by an application master to store information concerning a set of application servers to which a set of applications have been distributed in accordance with some embodiments.

FIGS. 3A-3B are examples of data structures that may be used by the application master 150 to monitor resource usage at the application servers 160. FIG. 3A is a block diagram of a table or other data structure 300 storing information about each of the applications in the main library 152. Alternately, the data structure 300 includes information for a subset of the applications, such as active applications that have been distributed to application servers. The data structure 300 includes a respective record 302 for each application for which information is stored. In some embodiments, the record 302 is maintained by the application master 150 and stores the information specific to the application (e.g., record 302-B for Application B) including:

- a unique application identifier (application ID) 310;
- the location of the application's source code (Source Code Location) 312;
- the storage size of the application 314;
- a version identifier for the application 316;
- distribution data 318 identifying application servers that have a copy of the application in their local libraries; and
- application resource data 320, which includes information about the resources consumed by the application.

In some embodiments, the distribution data 318 includes:
- information identifying the application servers that contain the respective application (e.g., Application Server IDs) 322; and
- optionally, dates and times showing when the respective application was distributed to the identified application servers (Distribution Date/Time) 324.
- a number 325 representing the allocated minimum cached instances requirement for the application. When this value is zero, there is no minimum number of cached instances for the application. In some embodiments, the minimum number of cached instances is equal to 0 for some applications and is equal to 3 for applications that have a non-zero cached instances requirement. In other embodiments, the number of minimum cached instances for a respective application can be any non-negative integer.

Embodiments of a unique application identifier may include a database key or other uniquely assigned identifier that is specific to a particular application. Embodiments of a source code location may include a pointer or reference to one or more database records. Other embodiments may include an identifier that refers to one or more particular non-volatile storage devices and/or storage locations within particular non-volatile storage device(s), such as particular hard drive(s) and/or locations on particular hard drive(s) associated with one or more application server(s). Embodiments of a storage size of the application may include information about file size(s) of the application source code, expected or known storage requirements for an active instance of the application, and/or historical usage data such as aggregated memory consumption data for the application.

In some embodiments, the application resource data 320 for a particular application includes one or more of the following fields: CPU usage information 326, indicating an amount of CPU usage over a predefined period of time, or per execution, or other statistics (e.g., minimum, maximum, average, mean, standard deviation) relating to CPU usage by the application; frequency of requests 328, indicating a number of executions of the application per predefined period of time, or other statistics relating to the frequency of requests for the application; and memory usage 330, indicating the amount of memory used during execution of the application, or other statistics relating to memory usage by the application. It is noted that the fields of the data structure 300 described above are examples of information stored by the application master. In other embodiments, the application master 150 may store a subset of these fields, and may optionally store additional information about the applications in the master library 152. Furthermore, the information represented here as being stored in data structure 300 may be organized in other ways, for example divided over multiple data structures, in other embodiments of the invention.

FIG. 3B is a block diagram of a table or other data structure 340 storing information about each of the application servers 160 in the application execution system 130. Alternately, the data structure 340 includes information for a subset of the application servers, such as active application servers serviced by the application master. The data structure 340 includes a respective record 342 for each application server for which information is stored. In some embodiments, the record 342 is maintained by the application master 150 and stores the information specific to the application server (e.g., record 342-2 for Application Server 2), including:

- a unique identifier 344 (e.g., network ID) for the application server, for example an identifier that indicates or that can be used to find the server's location on the network;
- local library data 346 identifying the specific applications installed on the application server's local library; and
- resource data 348 indicating the amount of resources used by the application.

The local library data 346 includes information (e.g., application identifiers 350) identifying the applications installed on the application server. Optionally, local library data 346 includes additional information, such as distribution date information or version information for the listed applications. The information in the local library data 346 for a respective application server is received from that application server, and may be stored at the application server either as a distinct data structure, or together with the local application library itself, or in combination with other information retained by the application server.

The resource data 348 may include information on the CPU load 352 of the application server (e.g., statistics, such as average, mean, minimum, maximum, standard deviation, etc.) over a predefined period of time, memory load 354 of the application server (e.g., statistics of volatile memory usage over a redefined period) from which the application master can determine the amount of memory used and available on the application server, and server storage data 356 (e.g., non-volatile storage available, storage used, etc.) from which the application master can determine the amount of non-volatile storage available on the application server. It is noted that the fields of the data structure 340 described above are examples of information stored by the application master. In other embodiments, the application master may store a subset of these fields, and may optionally store additional information about the application servers in the application execution system 130. Furthermore, the information represented here as being stored in data structure 340 may be organized in other ways, for example divided over multiple data structures, in other embodiments of the invention.

Furthermore, some embodiments may use different information acquisition or propagation models or paradigms. Some embodiments may store the resource and/or application data in one or more centralized or shared databases accessible to the application master. Other embodiments may store the resource and/or application data in dedicated data storage device or system that is accessible to the application master and/or to the applications in a data center, but that is not itself considered as part of the data center. In some embodiments, such an external database or data storage solution may be physically situated in the data center but logically represented as a separate system. In other embodiments, such an external database or data storage solution may be physically separated from the data center where an application master and its associated application servers reside. In some embodiments, the application servers may be configured to push data to and/or pull data from an application master and/or an associated resource information database. In other embodiments, the application master may be configured to push data to and/or pull data from the application servers.

Figure 3C:
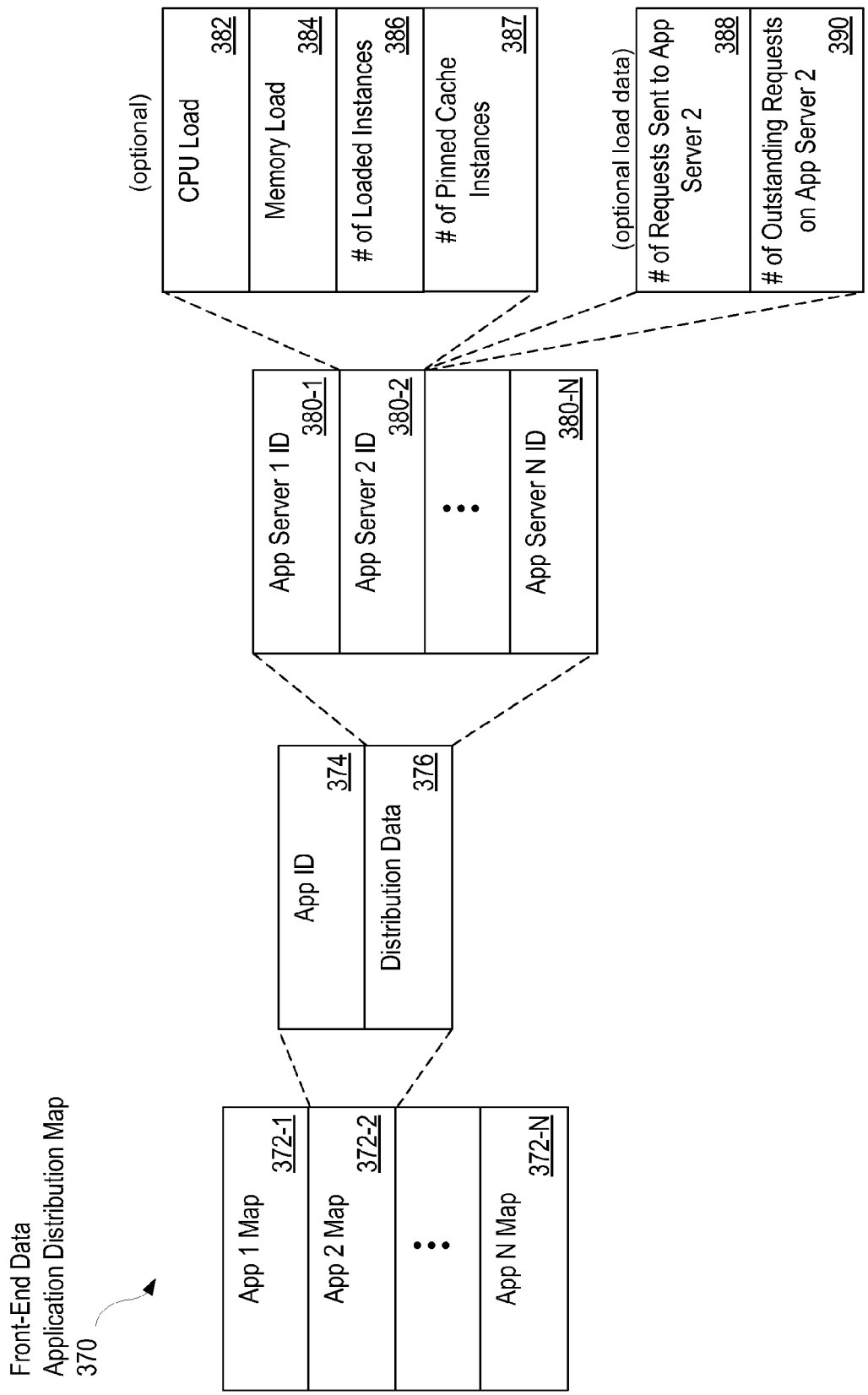
FIG. 3C illustrates a data structure used by a front-end server to route application processing requests to application servers in accordance with some embodiments.

FIG. 3C is a block diagram of a table or other data structure 370 used by a front-end server 140 to route application processing requests to application servers 160. In accordance with some embodiments, the application master 150 (FIG. 1) generates distribution data identifying which of the applications are present in the non-volatile storage of each of the application servers, and the one or more front-end servers 140 of the application execution system 130 route requests to the application servers in accordance with the distribution data. In some embodiments, the front-end servers 140 route requests to the application servers based on load data collected from the application servers. In the example shown in FIG. 3C, the distribution data, and optionally other information that can be used for determining the application server to which a respective application execution request should be routed, is stored in a data structure 370 such as the one shown in FIG. 3C.

The data structure 370 stores a respective record 372 for each application to which the front-end 140 may need to route application execution requests. This record 372 may be called an application distribution map. In some embodiments, the record 372 for a respective application includes the following information: an identifier 374 of the application, and distribution data 376 for the application. The distribution data 376 includes a list of identifiers 380 or other information identifying the application servers that have a copy of the application in their local libraries. Optionally, the distribution data 376 includes resource information associated with respective application at each of the identified application servers, such as one or more of: CPU load information 382, memory load information 384, and the number of loaded instances 386 of the application at the respective application server (the loading of application instances in volatile memory is described in more detail below). In some embodiments, the distribution data for an individual application server includes the number of pinned cache instances 387. This number is determined by the application master and implemented by the individual application server. The number of cache pinned instances 387 specifies how many instances of the application are to be retained in cache. These application instances are considered to be fixed or "pinned" to the cache and therefore not candidates for removal. In other words, the cache pinned instances are exempt from the normal cache eviction policy. In some embodiments the only possible values for the number of cache pinned instances 387 are 0 or 1. In some of these embodiments, this is specified as a Boolean value instead (i.e., does a particular application server have a cache pinned instance). In other embodiments, the number of cache pinned instances may be any non-negative integer.

It is noted that the fields of the data structure 370 described above are examples of information stored by the application master. In other embodiments, the application master 150 may store a subset of these fields, and may optionally store additional information about the distribution of applications in the application execution system 130. In some embodiments, the application master 150 may store such information in a non-volatile storage or database connected to or included as part of the application master. In other embodiments, the application master 150 may access or otherwise send and receive such information from a logically or physically distinct database or other data storage solution.

Furthermore, the information represented here as being stored in data structure 370 may be organized in other ways, for example divided over multiple data structures, in other embodiments of the invention. Two examples of additional information that may optionally be included in the resource data 370 (or 348, FIG. 3B) for a particular application server are: the number of (application execution) requests 388 that have been sent to the application server over a defined period of time (e.g., an hour), and/or the number of outstanding (or queued) requests 390 that are pending at the application server. The resource data 370 (or 348), stored by the front-end for a respective application server may comprise averages or running averages of resource usage by the applications being executed by the respective application server.

In the embodiment shown, the front-end server 140 receives the application distribution map 370 from the application master 150. As noted above, the application distribution map 370 optionally includes resource usage information that can be used to route requests received from client(s) 102. For example, upon receiving a request from a client to execute a specified application, the front-end server 140 accesses the corresponding record 372 (of application distribution map 370) for the specified application to determine the application servers that have copies of the application. In some embodiments, the front-end server 140 routes such requests using a round robin methodology (e.g., in round robin order within the list of application servers in the record 372 for the application), or a random assignment methodology (e.g., randomly or pseudo-randomly among the application servers listed in record 372).

In some other embodiments, the front-end server 140 routes requests based on current and historical load information that the front end server has observed directly. In some embodiments, load metrics that the front-end server 140 can observe directly include the number of application execution requests that the front-end server 140 has recently sent to each application server, and the number of currently outstanding application execution requests at each application server (e.g., the number of recent application execution requests sent to each application server which have yet to return results or a signal of completion). It is noted that the number of pending application execution requests (also called currently outstanding application execution requests) is a latency metric, and thus measures performance from the perspective of the system's users. Using this information, which may be observed and stored by the front-end server 140, the front end server 140 may route application requests. For example, the front-end server 140 may route a request to the application server that (A) has a copy of the requested application, and (B) the least number of outstanding requests. In another example, the front-end server 140 may route a request to the application server that (A) has a copy of the requested application, and (B) the least number of outstanding requests for the requested application. In some embodiments, an application execution request may include a request for a database connection or a request for data from a database associated with the application. In some embodiments, an application execution request may be originated by an application user. In some embodiments, an application execution request may be initiated or otherwise triggered by another application or as a result of certain parameters or conditions being met. In some variations, the application in question may be a portion, component, or provider of data for another application, and may not itself be user facing or otherwise configured for direct interaction with a user.

Alternately, the front end server 140 accesses resource information associated with the application servers that have copies of the application, and uses that information to route the request. For example, the front end server 140 may select an application server having the lowest load (e.g., CPU load, memory load, or a predefined combination thereof), or a load below a predefined threshold. Alternately, the front end server 140 may take into account the number of instances of the application already loaded in the volatile memory of each of the listed application servers, and may favor sending the request to an application server having one or more loaded instances of the application so long as predefined the server also meets predefined load criteria (e.g., a load level below a threshold, a load lower than other application servers having one or more loaded instances of the application).

Figure 4A:
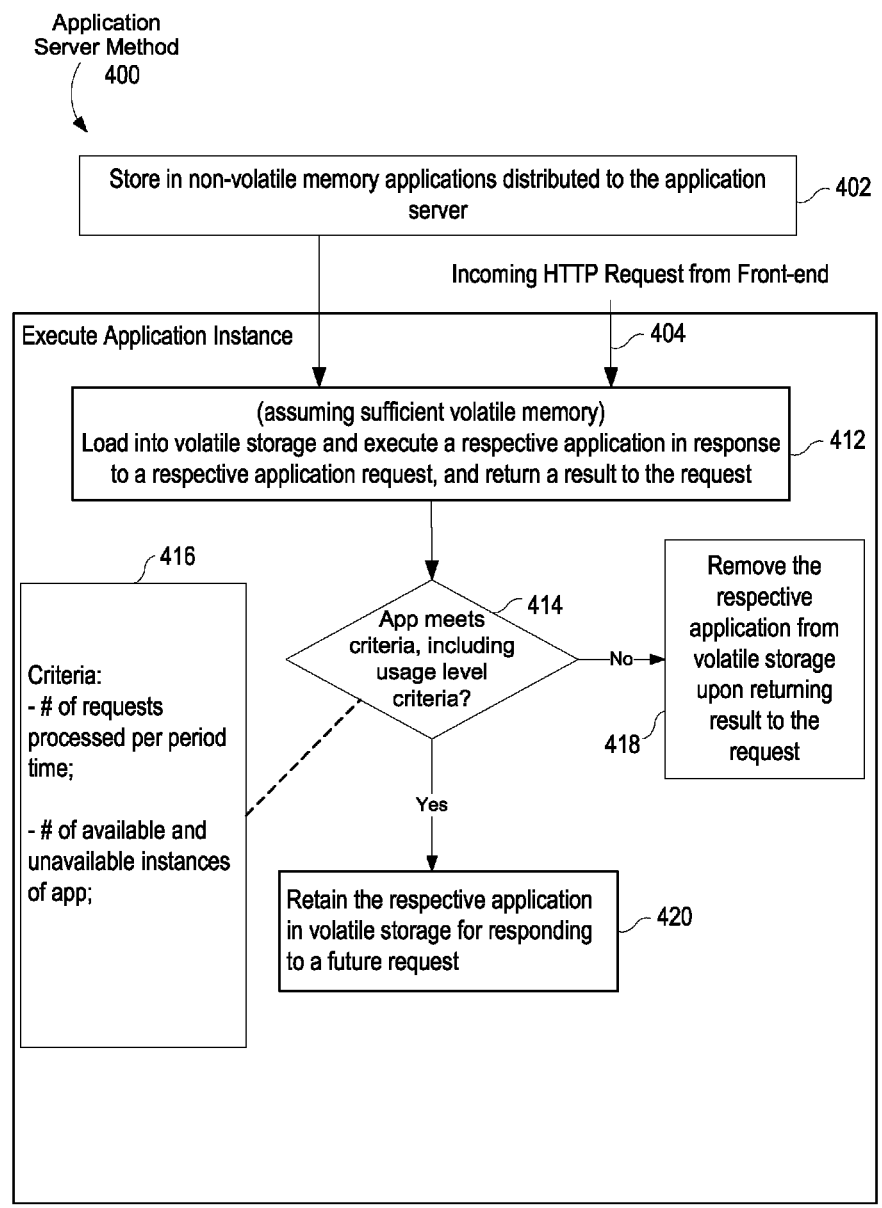
FIG. 4A is a flow diagram illustrating a method performed by an application serve, in accordance with some embodiments.

FIG. 4A is a flow diagram illustrating an embodiment of a method 400 performed by an application server, in accordance with some embodiments. The applications distributed to the application server by the application master are stored in the application server's non-volatile memory (402). Assuming that there is sufficient volatile memory, in response to an application request (404) from the front-end 140, the application server loads the requested application into volatile storage, executes the requested application, and returns a result to the request (412). The application server may remove one or more applications from volatile memory before performing operation 412 when there is insufficient volatile memory to process the request. Alternatively, the application server may automatically remove applications from volatile memory when the amount of available volatile storage is below a predefined threshold.

In some embodiments, after returning the result to the request, the application server can either remove the respective application from volatile storage (418), or retain the respective application in volatile storage (420) for responding to future requests, by determining whether predefined criteria has been met (414). In some embodiments, the predefined criteria (416) used by the application server include usage level criteria, which may include the number of requests for the application processed per period of time. The predefined criteria may also include caching criteria, which may include the number of respective application instances in volatile storage available for handling new requests, and the number of respective application instances handling active requests and therefore not available for handling new requests. Cached application instances are discussed in more detail below with reference to FIG. 4B. The predefined criteria may also include error criteria, which may be based on the number of errors encountered during execution of the application, and the type of errors encountered. For example, the application server may remove the respective application from volatile storage if errors are encountered during N (e.g., 5, 10 or 20) consecutive executions of the application.

For applications that fail to meet the predefined criteria (414—No), the application server removes the respective applications from volatile storage upon returning the result to the request (418). In some embodiments, the application server may remove the respective applications from volatile storage according to a predefined order for removal. For example, the application server may remove the least recently used application.

In some embodiments, when determining which application instance to remove from volatile storage, the application servers may take into account the service quality levels of the applications for which instances are stored in volatile memory. The service quality level of each application may be based on the level of service requested, or paid for. Various forms of preferences (for retention of application instances in volatile memory) may be given to applications with high service quality levels, compared to applications with lower service quality levels. For example, lower service quality level application instances may be evicted before higher service quality level application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the applications. Variations of service quality levels may include minimum or average guaranteed levels of data throughput, latency, number of active database connections, number of active application instances, or other indicators or minimum or average guaranteed application performance.

For applications that meet the predefined criteria (414—Yes), the application server retains the respective applications in volatile storage for responding to future requests for the application (420). In some embodiments, the application server retains more than one application instance of the respective application in volatile storage in accordance with predefined caching criteria. In some embodiments, the application server limits the number of application instances in volatile storage. For example, the application server may limit the total number of application instances in volatile memory to ensure that there is sufficient volatile memory for other processing tasks. Alternatively, the application server may limit the number of instances of a respective application to ensure that other requested applications have access to sufficient volatile memory to service their requests.

Figure 4B:
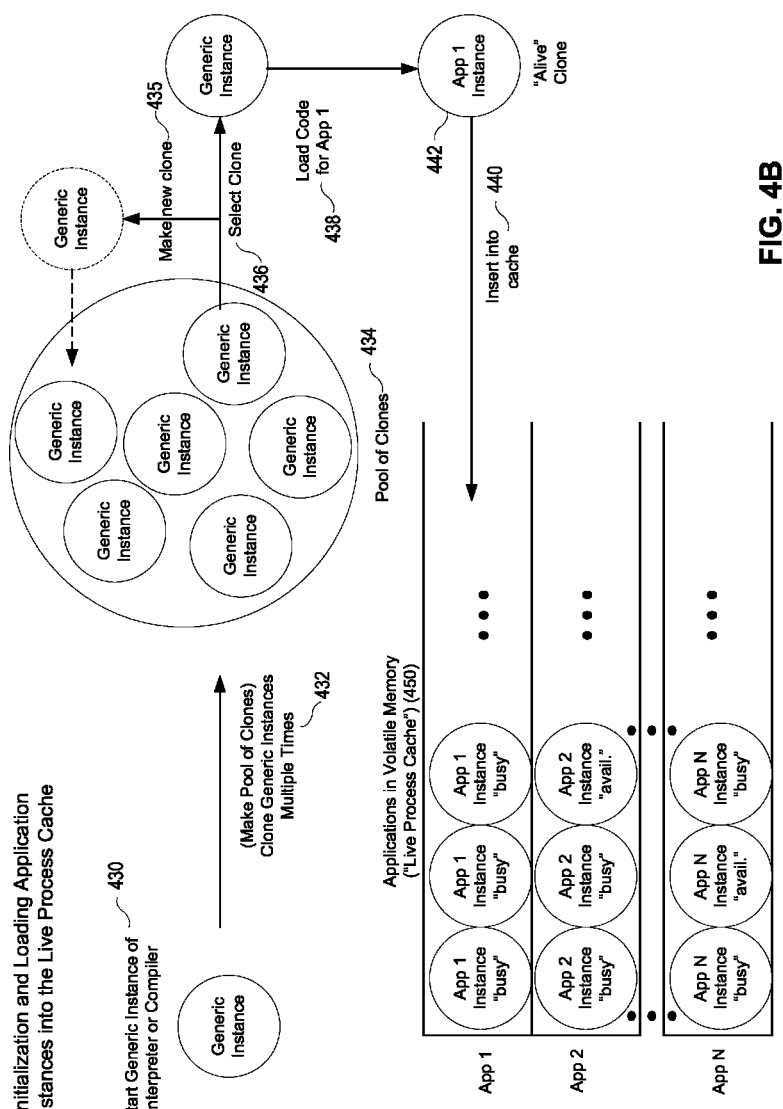
FIG. 4B is a conceptual diagram of a process for managing application instances in volatile memory by the application server in accordance with some embodiments.

FIG. 4B is a conceptual diagram of a process for managing application instances in volatile memory by the application server in accordance with some embodiments. The application servers actively manage application instances in volatile memory through a live process cache 450. The application server first initiates a generic application instance 430, sometimes called a "generic instance." The generic instance is "cloned" multiple times (432) resulting in a "pool of clones" (434) of the generic instance. When a request for an application is received, the application server removes (436) a generic instance clone from the "pool of clones" and loads the code for the requested application (438) into the generic instance clone to produce an application instance 442. In some embodiments, when a clone is removed from the "pool of clones," a request is issued to create a new generic instance clone to replace the one selected (435). The code for the requested application may be associated with any of a variety of programming languages including but not limited to: Java, Pert, Python, or C. In some embodiments, the application is executed using an interpreter, while in other embodiments the application code is compiled and linked (as needed) with any other code (e.g., library procedures) to produce code that is ready for execution by the application server, in the context of the application server's operating system.

In FIG. 4B, the application server receives a request for "App 1." The application server, in response, loads the code for "App 1" into a generic instance (438). The "App 1" instance may be referred to as "live" or "alive"" since it contains code that is readily executable by the application server. The App 1 instance is loaded into a cache (e.g., "Live Process Cache") 450. The cache may contain other instances of App 1 as well as instances of other requested applications. These application instances in the Live Process Cache 450 are either "busy" or "available," although other transitional states could be used in addition in other embodiments. A "busy" application instance is one that is processing a current request, and therefore cannot process another incoming request until it finishes processing the current request. The "available" instances are ready to process any received request for the respective application.

Figure 4C:
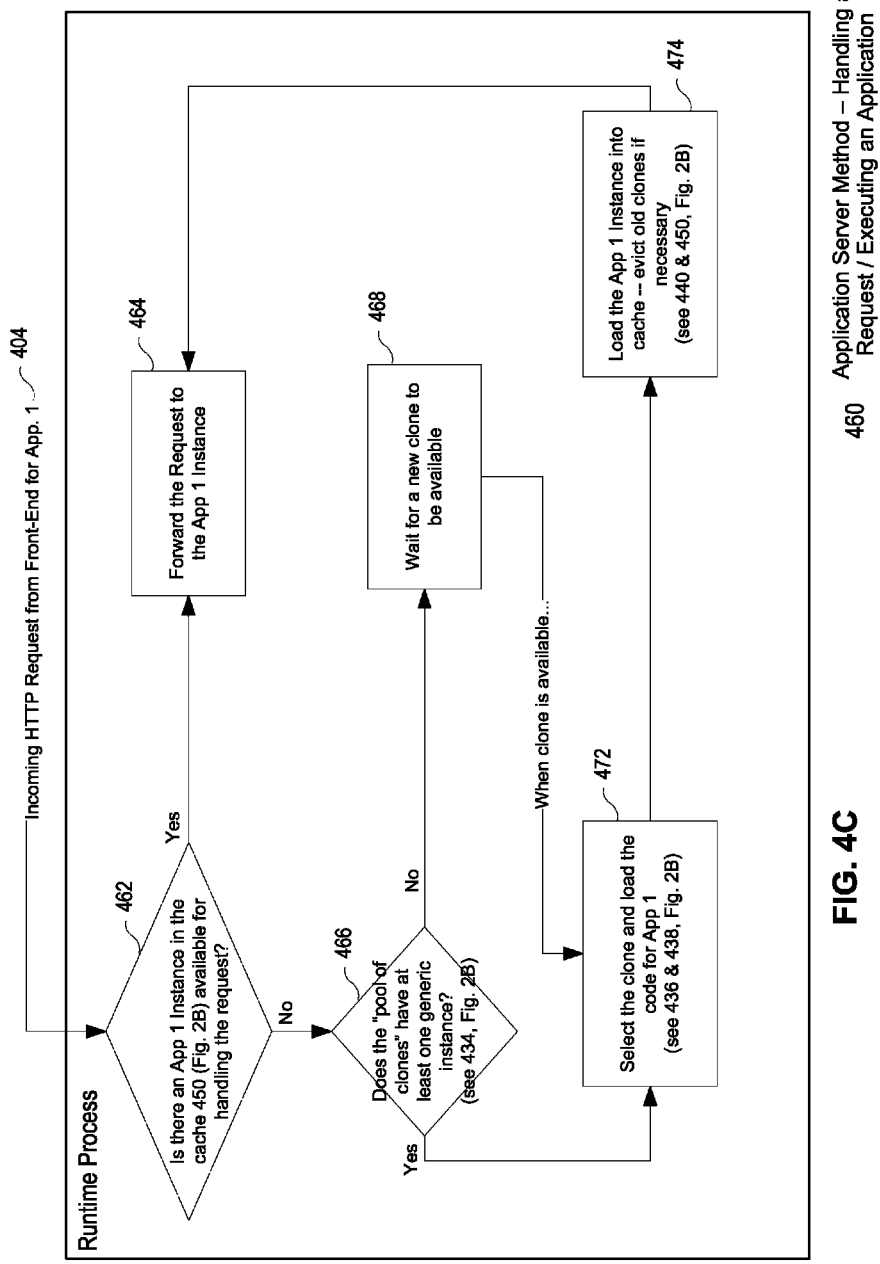
FIG. 4C is a flow diagram illustrating an example of a runtime process performed by an application server in accordance with some embodiments.

FIG. 4C is a flow diagram illustrating an example of a runtime process at the application server in accordance with some embodiments. For the purposes of this example, it may be assumed that the application server has sufficient resources available to handle an incoming request to execute an application. Upon receiving a request 404 from the front-end for "App 1," the application server queries the cache 450 (FIG. 4B) for an available "App 1" instance for handling the request. If the cache returns an available "App 1" instance (462-Yes), the request is forwarded to the returned instance for processing (464). If the cache does not return an available "App 1" instance (462—No), the application server determines if the "pool of clones" (434, FIG. 4B) has at least one generic instance (466). If there are generic instances available (466—Yes), a generic instance clone is selected from the "pool of clones" (472). The App 1 code is loaded onto the selected generic instance (472), and the App 1 instance is loaded into the live process cache (474). Other application instances (e.g., the least recently used instance) are removed from the cache if necessary (e.g., to make room for new application instances). If there are no generic instances available (466—No), the process waits for a generic instance clone to be available (468) before performing operations 472 and 474.

Figure 5:
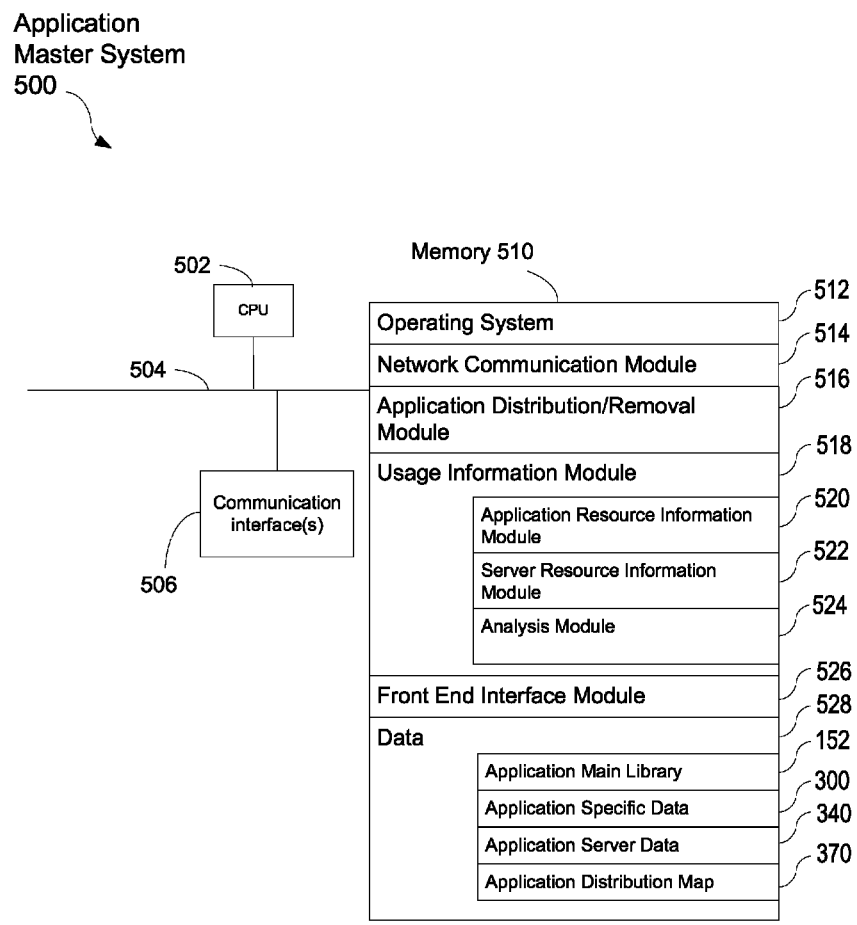
FIG. 5 is a block diagram of an application master, which may implemented using one or more servers in accordance with some embodiments.

FIG. 5 is a block diagram of an application master 500, which may implemented using one or more servers. For convenience, the application master 500 is herein described as implemented using a single server or other computer. The application master 500 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory and may also include non-volatile memory, such as one or more magnetic disk storage devices. Memory 510 may include mass storage (e.g., data store 170, FIG. 1) that is remotely located from the central processing unit(s) 502. Memory 510, or alternately the non-volatile memory device(s) within memory 510, comprises a computer readable storage medium. In some embodiments, memory 510 stores the following programs, modules and data structures, or a subset thereof:

- an operating system 512 that includes procedures for handling various basic system services and for performing hardware dependent tasks;
- a network communication module 514 that is used for connecting the application master 500 to other computers via the one or more communication network interfaces 506 (wired or wireless) and one or more communication networks, such as the Internet, other wide area networks, local area networks, metropolitan area networks, and the like;
- an application distribution/removal module 516 that is used for distributing applications from the main library 152 to the application servers 160 for storage in non-volatile storage of the application servers; the application distribution/removal module 516 also includes instructions for removing previously distributed applications from the non-volatile storage of respective application servers in accordance with usage information, as discussed above with reference to FIG. 2B;
- a usage information module 518 that includes procedures for monitoring the application servers to generate usage information;
- a front end interface module 526 that is used for interfacing with the front end servers 140 (FIG. 1); and
- data 528, which includes the main library data 152, application specific data 300, application server data 340, and the application distribution map 370.

The procedures in the usage information module 518 include an Application Resource Information Module 520 to retrieve application resource information (e.g., application specific data stored in data structure 300, FIG. 3A), and a server resource information module 522 to retrieve resource information concerning the application servers (e.g., application server data stored in data structure 340, FIG. 3B). In some embodiments, the usage information module 518 also includes one or more procedures 524 (Analysis Module) for analyzing the retrieved application resource and server resource information to generate usage statistics.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Figure 6:
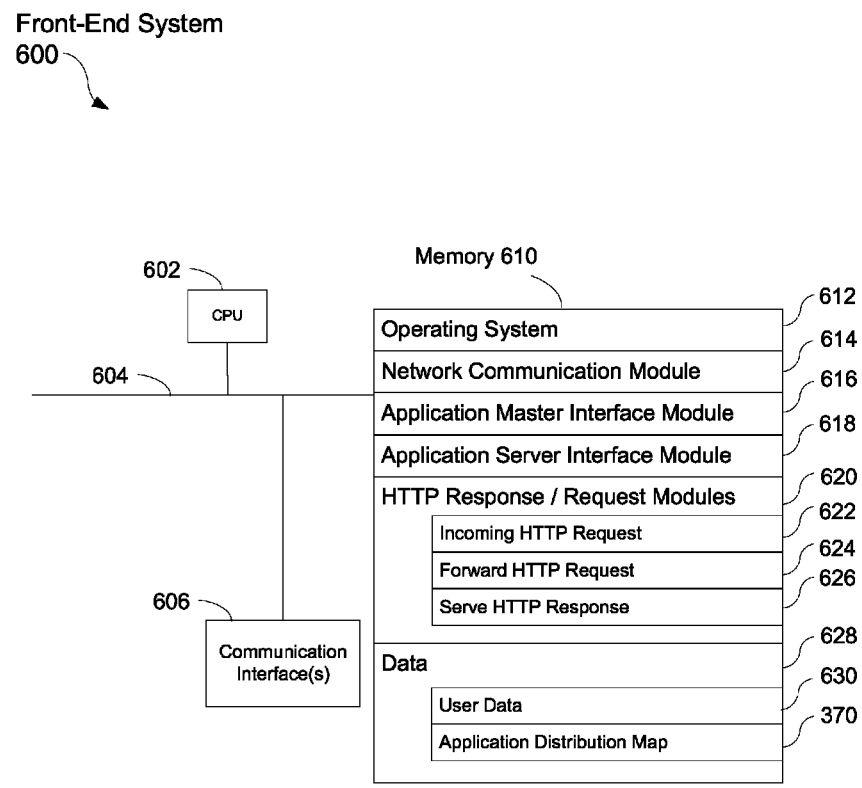
FIG. 6 is a block diagram of a front-end system, which may implemented using one or more servers in accordance with some embodiments.

FIG. 6 is a block diagram of a front-end system 600, which may implemented using one or more servers. For convenience, the front-end system 600 is herein described as implemented using a single server or other computer. The front-end system 600 generally includes one or more processing units (CPU's) 602, one or more network or other communications interfaces 606, memory 610, and one or more communication buses 604 for interconnecting these components. The communication buses 604 may include circuitry (sometimes called a chipset) that interconnects and controls communications between system components. Memory 610 may include high speed random access memory and may also include non-volatile memory, such as one or more magnetic disk storage devices. Memory 610 may include mass storage (e.g., data store 170, FIG. 1) that is remotely located from the central processing unit(s) 602. Memory 610, or alternately the non-volatile memory device(s) within memory 610, comprises a computer readable storage medium. In some embodiments, memory 610 stores the following programs, modules and data structures, or a subset thereof:
- an operating system 612 that includes procedures for handling various basic system services and for performing hardware dependent tasks;
- a network communication module 614 that is used for connecting the front-end 600 to other computers via the one or more communication network interfaces 606 (wired or wireless) and one or more communication networks, such as the Internet, other wide area networks, local area networks, metropolitan area networks, and the like;
- an application master interface module 616 that is used for interfacing with the application master 150 (FIG. 1);
- an application server interface module 618 that is used for interfacing with the application servers 160 (FIG. 1);
- response and request modules 620 for handling incoming client 102 requests for applications. In some embodiments, the response and request modules 620 include procedures for receiving incoming requests (Incoming HTTP Request) 622 and for forwarding the HTTP Request to application servers 160 (FIG. 1) that host the requested application (Forward HTTP Request) 624. The response and request modules 620 may also include procedures for serving responses from the application servers 160 to the clients 102 (Serve HTTP Response) 626.
- data 628 which includes user data 630 and the application distribution map 370. In some embodiments, the user data 630 include client-specific information passed to the front-end 140 by the client 102 (e.g., parameters embedded in the HTTP request). The application distribution map 370 includes information used by the front-end to route application processing requests to application servers. This is described in more detail above with reference to FIG. 3C.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Figure 7:
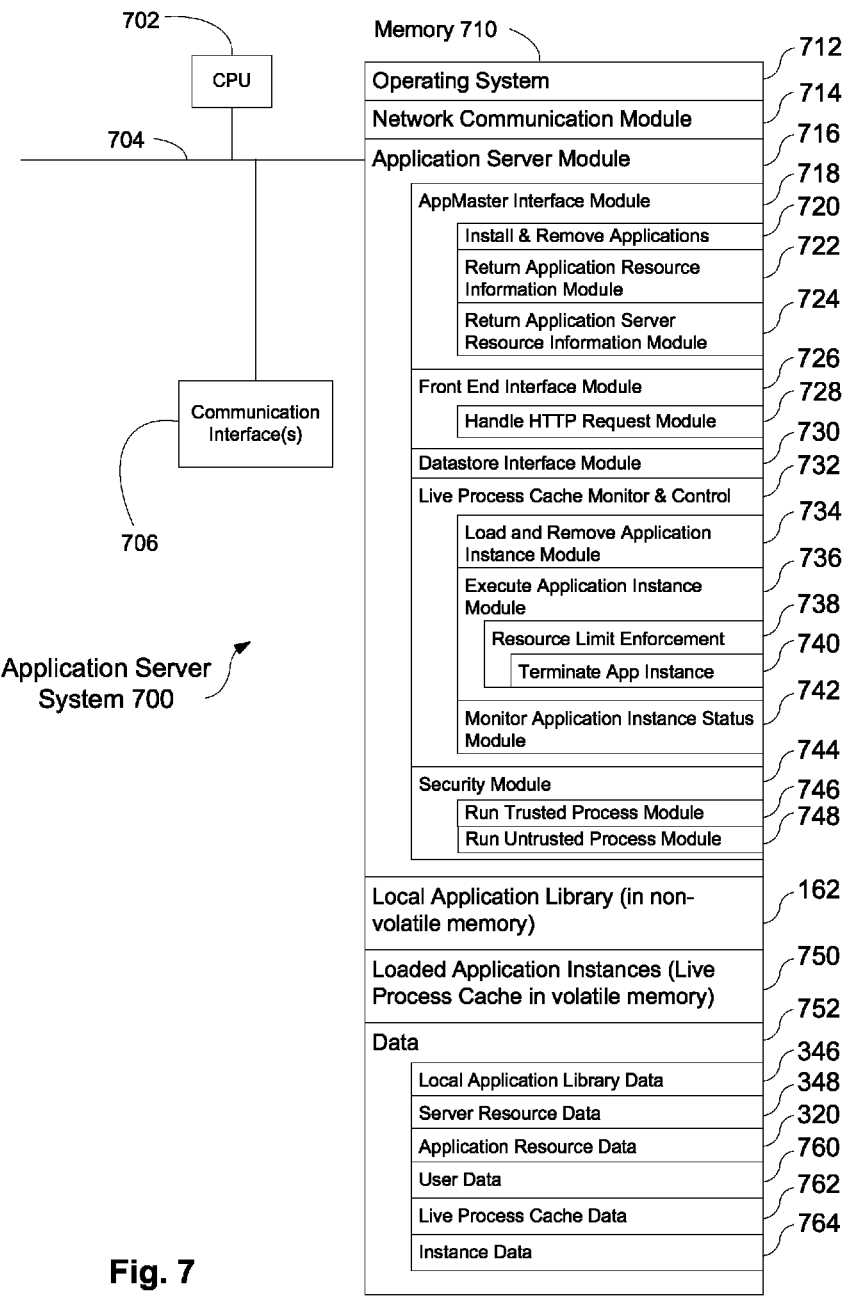
FIG. 7 is a block diagram of an application server in accordance with some embodiments.

FIG. 7 is a block diagram of an application server 700, which may implemented using one or more servers. For convenience, the application server 700 is herein described as implemented using a single server or other computer. The application server 700 generally includes one or more processing units (CPU's) 702, one or more network or other communications interfaces 706, memory 710, and one or more communication buses 704 for interconnecting these components. The communication buses 704 may include circuitry (sometimes called a chipset) that interconnects and controls communications between system components. Memory 710 may include high speed random access memory and may also include non-volatile memory, such as one or more magnetic disk storage devices. Memory 710 may include mass storage (e.g., data store 170, FIG. 1) that is remotely located from the central processing unit(s) 702. Memory 710, or alternately the non-volatile memory device(s) within memory 710, comprises a computer readable storage medium. In some embodiments, memory 710 stores the following programs, modules and data structures, or a subset thereof:
- an operating system 712 that includes procedures for handling various basic system services and for performing hardware dependent tasks;
- a network communication module 714 that is used for connecting the application server 700 to other computers via the one or more communication network interfaces 706 (wired or wireless) and one or more communication networks, such as the Internet, other wide area networks, local area networks, metropolitan area networks, and the like;
- an application server module 716 that is used for processing application requests. In some embodiments, the application server module 716 includes an application master interface module 718 for interfacing with the application master 150 (FIG. 1), a front-end interface module for interfacing with the front-end 140, a data store interface module for interfacing with the data store 170, a live process cache monitor and control 732 for managing application instances in the live process cache 450 (FIG. 4B). The application server module 716 may also store a security module 744 for executing untrusted processes (Run Untrusted Process Module) 748 and trusted processes (Run Trusted Process Module) 746. Some of the procedures included in the application server module 716 are further described below.

a local application library 162, for storing the applications distributed to the application server by the application master 150;

application instances in volatile memory 750 (e.g., in a live process cache 450, FIG. 4B) for servicing application requests. In some embodiments, there is at least one application instance for an application in volatile memory.

data 752, which includes local application library data 346, described above with reference to FIG. 3B, server resource data 348, described above with reference to FIG. 3B, and application resource data 320, described above with reference to FIG. 3A. When needed, data 752 includes user data 760, which may include data received from a requesting user (e.g., user name, passwords, user preferences, profiling information) and/or data produced or retrieved for the requesting user by the application server. In addition, data 752 may include live process cache data 762, described below with reference to FIG. 8. In some embodiments, data 752 also includes instance data 764, which includes information about application instances at an application server 700. Instance data 764 is described in more detail below with respect to FIG. 9.

In some embodiments, both application resource data 320 and server resource data 348 are sent by the application server to the application master 150, which allows the application master 150 to monitor the application servers 160 and generate usage statistics (e.g., see FIG. 2B).

In some embodiments, the application master interface module 718 includes procedures 720 for adding or removing applications from the non-volatile storage of the application server (Install & Remove Applications). The application master interface module 718 may also include procedures 722, 724 for sending usage information on application resources (Return Application Resource Information Module) and server resources (Return Application Server Resource Information Module) to the application master. In some embodiments, the front end interface module 726 includes procedures for handling application requests (Handle HTTP Request Module) 728 forwarded from the front end 140.

In some embodiments, the application server module 716 also includes procedures (Live Process Cache Monitor & Control) 732 for monitoring and controlling the live process cache. These procedures include procedures (Load and Remove Application Instance Module) 734 for loading and removing application instances into the live process cache in accordance with application usage and available volatile memory. There are also procedures (Execute Application Instance Module) 736 for executing application instances when processing application requests.

The Execute Application Instance Module 736 may also include procedures (Resource Limit Enforcement) 738 for limiting resource consumption of a particular application. For example, an application that consumes more resources than a limit or threshold will be terminated (Terminate App Instance) 740. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The live process cache monitor & control module 732 may also include procedures for monitoring the status of application instances (Monitor Application Instance Status Module) 742. For example, the status of the application instances may be "busy," "available," or any transitional state in between (see FIG. 4B).

Figure 8:
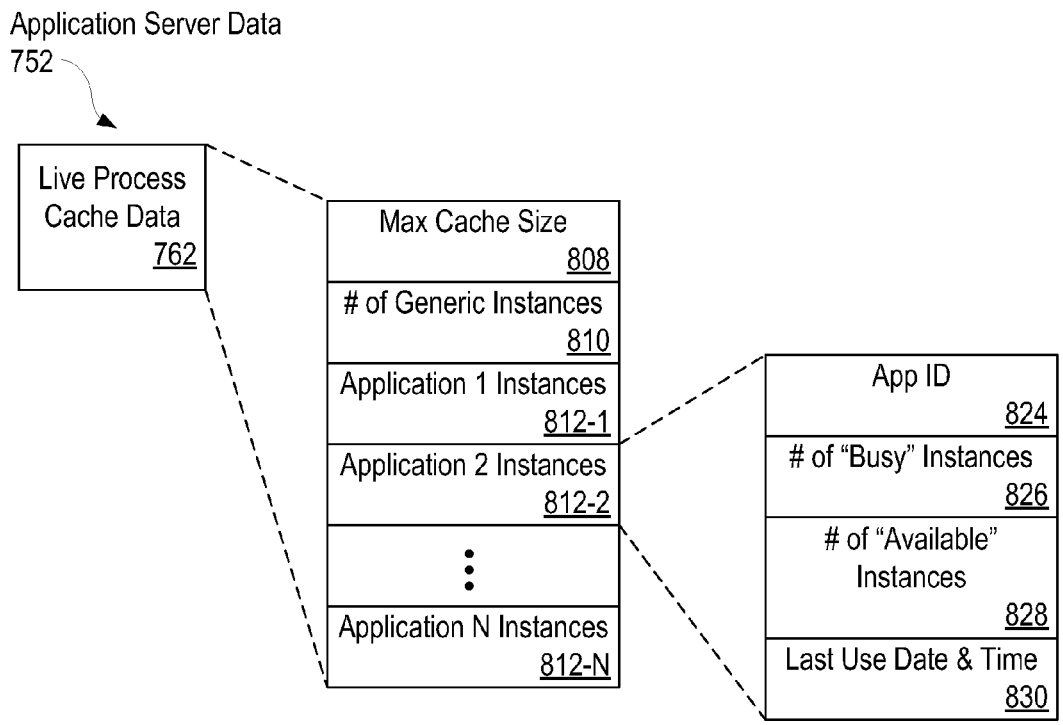
FIG. 8 is a block diagram illustrating a data structure for use by the application server for storing information relating to application instances in volatile memory in accordance with some embodiments.

As shown in FIG. 8, in some implementations application server data 752 includes a table or other data structure, herein called live process cache data 762, for storing information relating to application instances stored in volatile memory (e.g., Live Process Cache 450, FIG. 4B), for processing application requests. As shown in FIG. 8, live process cache data 762 includes the following items of information, or a subset or superset thereof:

cache size information 808, which may be represented (for example) in terms of memory capacity (e.g., a number of gigabytes), or a maximum number of application instances that can be stored in the live process cache;

the number of generic instances 810 currently available for allocation; and information 812 about each of the applications, or application instances, currently in the live process cache 450. For example, information 812 may indicate for each application having at least one instance in the live process cache, the identity 824 of the application, the number 826 of busy instances of the application, the number 828 of available instances of the application, and last use information 830 (e.g., the date/time of last use of the application, or other information sufficient to enable implementation of a cache eviction policy).

Figure 9:
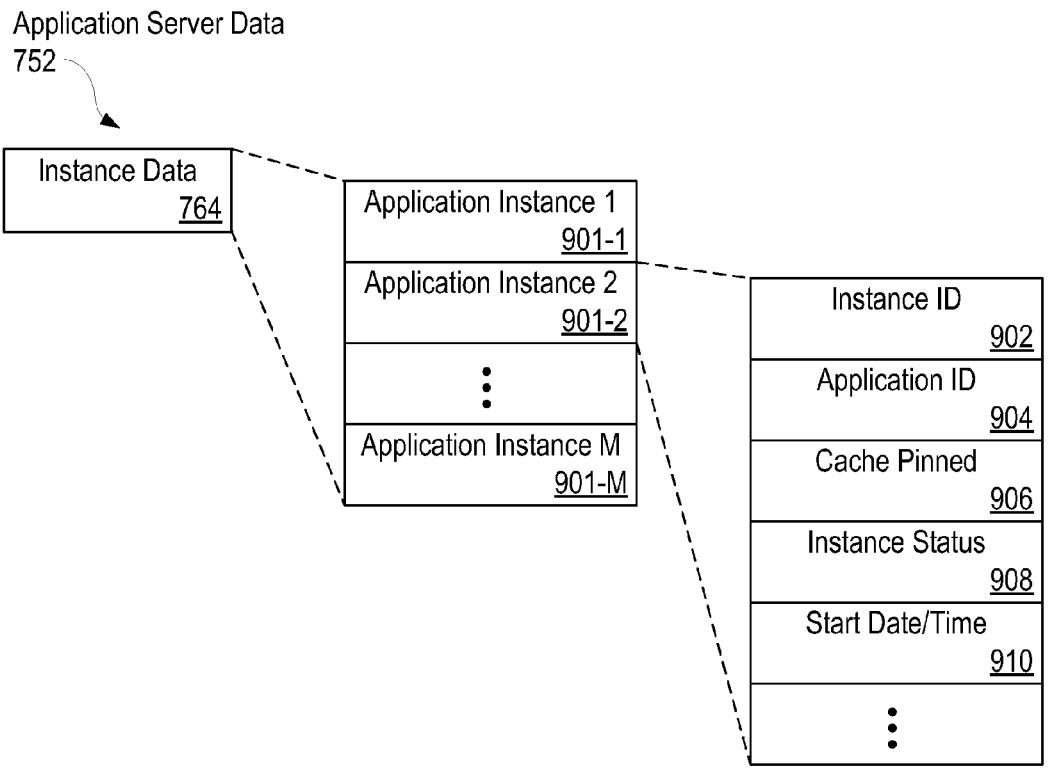
FIG. 9 is a block diagram illustrating a data structure for use by the application server for storing information relating to individual application instances in volatile memory in accordance with some embodiments of the invention.

As shown in FIG. 9, in some implementations application server data 752 includes a table or other data structure, herein called instance data 764, for storing information about application instances stored in volatile memory (e.g., Live Process Cache 450, FIG. 4B). As shown in FIG. 9, instance data 764 includes a instance data record 901 or set of data for one or more application instances stored in volatile memory. Each instance data record 901 include the following items of information, or a subset or superset thereof:

an instance ID 902, which uniquely identifies the instance on the application server;

an application ID 904, which uniquely identifies the application;

a cache pinned flag 906, which indicates whether this instance is pinned in the cache (i.e., in the cache and exempt from cache eviction);

an instance status 908. In some implementations, the status value for each application instance in volatile memory is either "busy" or "available". In some other implementations, a larger set of status values (e.g., warming, available, busy, finishing, etc.) are used to describe the status of the application instances in volatile memory;

a start date/time 910, indicating when this application instance was started.

Each of the above identified elements in FIGS. 7, 8, and 9 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIGS. 5, 6 and 7 show an application master, a front end server and an application server, these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 5, 6 or 7 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

According to some embodiments, a respective application server 160 or 700 has a limited amount of volatile memory, and uses a cache eviction policy to keep in cache applications that have higher usage. Applications with low usage are evicted from the cache when other applications need to be loaded into the cache. In some cases, when such a low-usage application is requested, it may take longer to load than if it had been kept in cache. In some such cases, an owner of such an application may pay a premium to keep a certain number of instances of the application in cache, thus circumventing the normal cache eviction policy. For example, an application owner may pay a specified fee (e.g., $0.30 or $1.00 per day or a specified weekly or monthly or annual rate) to keep a certain number of application instances always in cache. In some embodiments, the predefined number of application instances that remain "always-on" is configurable by the application owner (e.g., paying more for a greater number of instances). In other embodiments, the number is fixed (e.g., three). In some embodiments, the predefined minimum number of instances are distributed to distinct application servers for reliability. In this case, if one application server goes down, only one instance of the application is lost. In other embodiments, the predefined minimum number of instances can be distributed to any of the available application servers, and may include more than one instance on a single application server.

The application master 150 or 500 stores information, or has access to information, specifying the minimum number of application instances required for a respective application, and distributes them to individual application servers. Each application server receives information indicating application instances (if any) that are to be retained in cache. This process is sometimes referred to as "cache pinning."

In some embodiments, multiple versions of an application can exist simultaneously. In some of these embodiments, only one of the versions can be designated for access, so when cached pinning is applied, the one designated version is pinned. In other embodiments, a user can access various versions of the application, and the application request from a user can identify the desired version. In these embodiments, there is a default version, which is the version used if no specific version is requested. In some embodiments that allow multiple simultaneous versions to be accessed, cache pinning can be implemented either on a per version basis or on a per application basis. When cache pinning is implemented on a per application basis, only the default application version is cache pinned. When a new version is specified as the default, cached instances of the old version become eligible for removal from cache based on the cache eviction policy used by the application servers, and at least the specified minimum number of instances of the new version are distributed to application servers and loaded into the caches of those application servers. In the embodiments that implement cache pinning on a per version basis, each version of the application is effectively a distinct application.

Figure 10A:
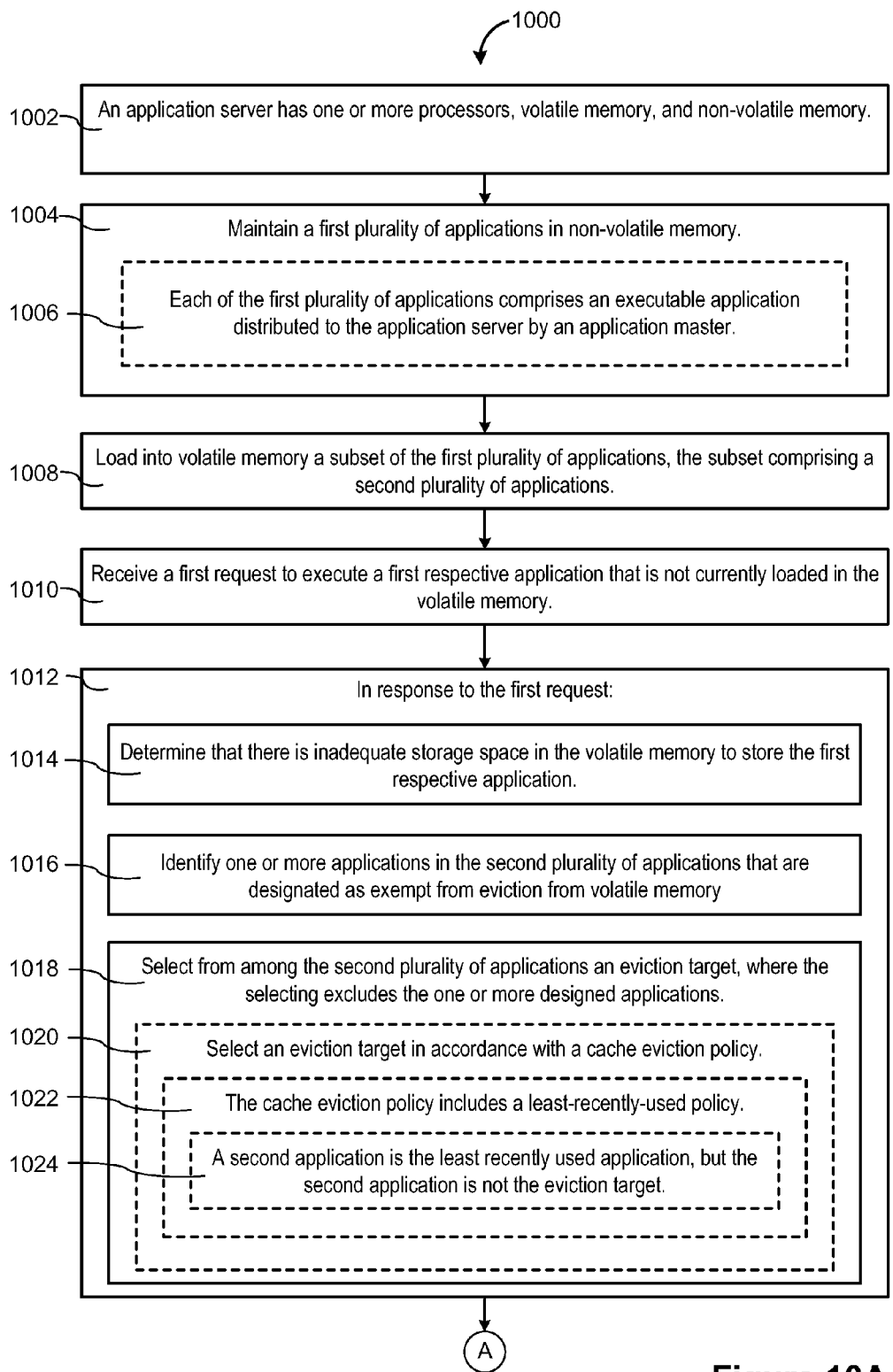
FIGS. 10A and 10B illustrate an exemplary process flow in accordance with some embodiments.
Figure 10B:
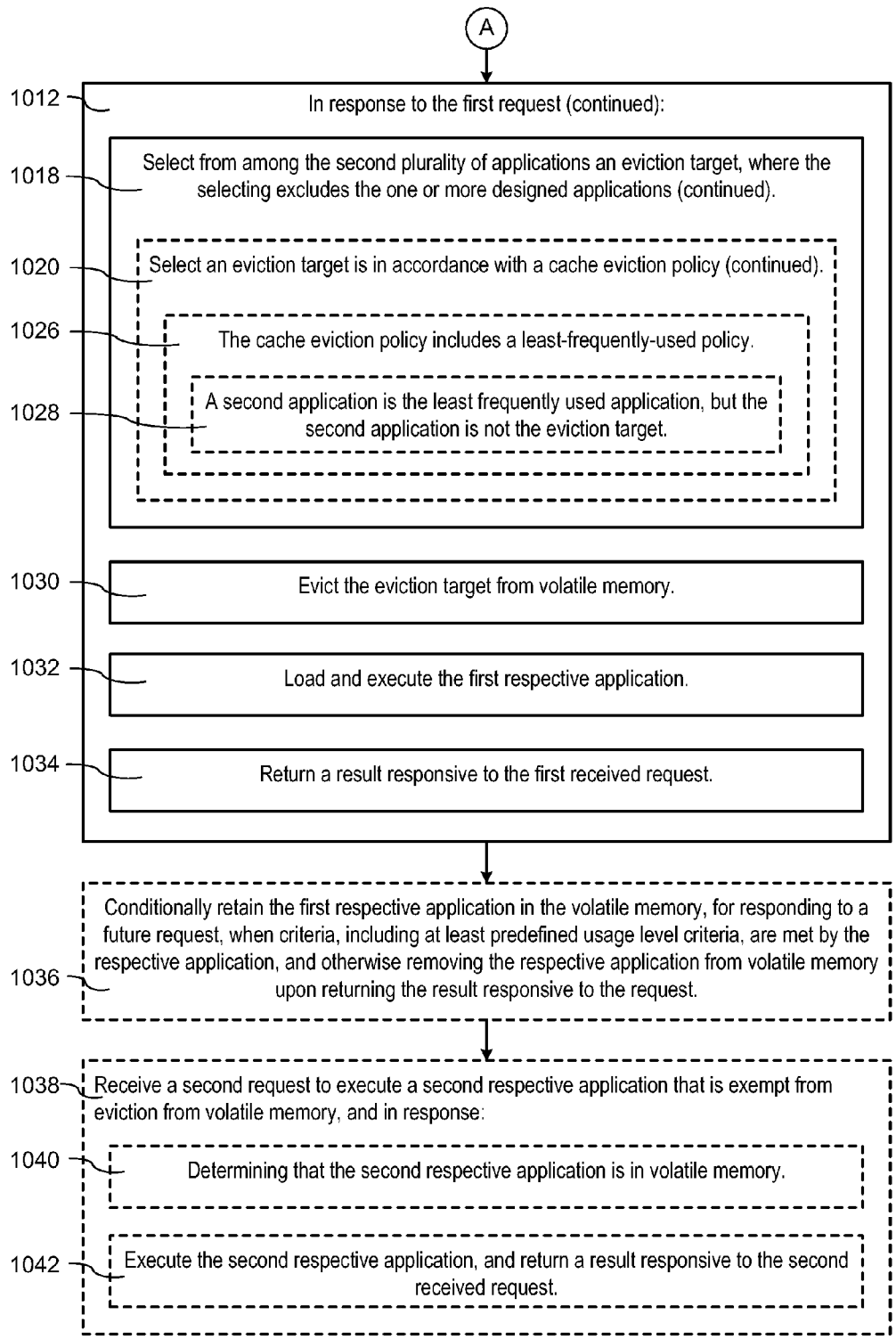

FIGS. 10A and 10B illustrate an exemplary process flow 1000 for some embodiments. Each application server 700 has (1002) one or more processors, volatile memory, and non-volatile memory. The application server 700 maintains (1004) a first plurality of applications in non-volatile memory. In some embodiments, each of the first plurality of applications is (1006) an executable application distributed to the application server 700 by the application master 500. The application server loads (1008) into volatile memory application instances for a subset of the first plurality of applications. The subset is (1008) a second plurality of applications. The application server receives (1010) a first request to execute a first respective application that is not currently loaded in the volatile memory.

In response (1012) to the first request, the application server performs a set of operations. The application server 700 determines (1014) that there is inadequate storage space in the volatile memory to store the first respective application. The application server 700 then identifies (1016) one or more applications in the second plurality of applications that are designated as exempt from eviction from volatile memory. The application server 700 selects 1018 an eviction target (e.g., for cache eviction) from among the second plurality of applications (i.e., from among the application instances in volatile memory). The selection excludes (1018) the one or more applications that are designated as exempt. In some embodiments, the application server selects (1020) an eviction target (i.e., selects an application instance for eviction) in accordance with a cache eviction policy. In some of these embodiments, the cache eviction policy includes (1022) a least-recently-used policy. In some instances where the least-recently-used cache eviction policy is used, the least recently used application (sometimes called the second application for ease of reference) is not (1024) the cache eviction target because it is one of the applications designated as exempt from eviction.

In some embodiments, the cache eviction policy includes (1026) a least-frequently used policy. In some instances where the least-frequently-used cache eviction policy is used, the least frequently used application is not (1028) the cache eviction target because it is one of the applications designated as exempt from eviction. Embodiments of cache eviction may include actual erasure of the cached data, removal of pointers or other references to the cached data, and/or setting or otherwise indicating that portion of cache as available for use or data overwrite.

In the embodiment shown, the application server 700 evicts (1030) the eviction target from volatile memory. The application server 700 then loads (1032) and executes (1032) the first respective application. The application server 700 returns (1034) a result responsive to the first received request. The application server 700 conditionally retains (1036) the first respective application in the volatile memory, for responding to a future request, when criteria, including at least predefined usage level criteria are met by the respective application. If the first respective application does not met the criteria, the application server removes (1036) the respective application from volatile memory upon returning the result responsive to the request.

In some embodiments, the application server receives (1038) a second request to execute a second respective application that is exempt from eviction from volatile memory. In response to the second request, the application server determines (1040) that the second respective application is in volatile memory (i.e., is already in volatile memory when the second request is received). The application server then executes (1042) the second respective application and returns (1042) a result responsive to the second received request.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of operating an application server having one or more processors, volatile memory, and non-volatile memory, the method comprising:
    receiving a first request to execute a first application that is not currently loaded in the volatile memory of the application server, said first application being one of a first plurality of applications stored in the non-volatile memory of the application server;
    determining, in response to said receiving, that there is inadequate storage space in the volatile memory to store the first application;
    selecting from among a second plurality of applications stored in the volatile memory, an eviction target said selecting including
        determining whether any of said second plurality of applications are indicated as pinned to a cache, and
        in response to a determination that an application from among said second plurality of applications is indicated as pinned to the cache, excluding that application from selection as the eviction target;
    evicting from the volatile memory the eviction target; and
    loading and executing the first application in response to the first received request, and returning a result responsive to the first received request.

2. The method of claim 1, wherein selecting an eviction target is in accordance with a cache eviction policy.

3. The method of claim 1, further comprising:
    conditionally retaining the first application in the volatile memory, for responding to a future request, when criteria, including at least predefined usage level criteria, are met by the first application, and otherwise removing the first application from volatile memory upon returning the result responsive to the first received request.

4. The method of claim 2, wherein the cache eviction policy includes a least-recently-used eviction policy.

5. The method of claim 4, wherein only least recently used applications that are not pinned to the cache are eligible to be an eviction target.

6. The method of claim 2, wherein the cache eviction policy includes a least-frequently-used eviction policy.

7. The method of claim 6, wherein only least frequently used applications that are not pinned to the cache are eligible to be an eviction target.

8. The method of claim 1, wherein each of the first plurality of applications comprises an executable application distributed to the server by an application master.

9. The method of claim 1, further comprising:
    receiving a second request to execute a second application that is exempt from eviction from the volatile memory, and in response:
        determining that the second application is in the volatile memory; and
        executing the second application, and returning a result responsive to the second received request.

10. An application server system, comprising:
    a processor-readable memory; and
    one or more processors;
    the memory including instructions that, when executed by the one or more processors, cause the processors to perform a method of operating an application server having one or more processors, volatile memory, and non-volatile memory, the method comprising:
        receiving a first request to execute a first application that is not currently loaded in the volatile memory of the application server, said first application being one of a first plurality of applications stored in the non-volatile memory of the application server;
        determining, in response to said receiving, that there is inadequate storage space in the volatile memory to store the first application;
        selecting from among a second plurality of applications stored in the volatile memory, an eviction target said selecting including
            determining whether any of said second plurality of applications are indicated as pinned to a cache, and
            in response to a determination that an application from among said second plurality of applications is indicated as pinned to the cache, excluding that application from selection as the eviction target;
        evicting from the volatile memory the eviction target; and
        loading and executing the first application in response to the first received request, and returning a result responsive to the first received request.

11. The system of claim 10, wherein selecting an eviction target is in accordance with a cache eviction policy.

12. The system of claim 10, further comprising:
    conditionally retaining the first application in the volatile memory, for responding to a future request, when criteria, including at least predefined usage level criteria, are met by the first application, and otherwise removing the first application from volatile memory upon returning the result responsive to the first received request.

13. The system of claim 11, wherein the cache eviction policy includes a least-recently-used eviction policy.

14. The system of claim 13, wherein only least recently used applications that are not pinned to the cache are eligible to be an eviction target.

15. The system of claim 11, wherein the cache eviction policy includes a least-frequently-used eviction policy.

16. The system of claim 15, wherein only least frequently used applications that are not pinned to the cache are eligible to be an eviction target.

17. The system of claim 10, wherein each of the first plurality of applications comprises an executable application distributed to the server by an application master.

18. The system of claim 10, further comprising:
    receiving a second request to execute a second application that is exempt from eviction from the volatile memory, and in response:

determining that the second application is in the volatile memory; and executing the second application, and returning a result responsive to the second received request.

19. A non-transitory computer readable storage medium having instructions embodied thereon which, when executed by one or more processors, cause the one or more processors to perform a method of operating an application server having one or more processors, volatile memory, and non-volatile memory, the method comprising:

receiving a first request to execute a first application that is not currently loaded in the volatile memory of the application server, said first application being one of a first plurality of applications stored in the non-volatile memory of the application server;

determining, in response to said receiving, that there is inadequate storage space in the volatile memory to store the first application;

selecting from among a second plurality of applications stored in the volatile memory, an eviction target said selecting including determining whether any of said second plurality of applications are indicated as pinned to a cache, and in response to a determination that an application from among said second plurality of applications is indicated as pinned to the cache, excluding that application from selection as the eviction target;

evicting from the volatile memory the eviction target; and loading and executing the first application in response to the first received request, and returning a result responsive to the first received request.

20. The medium of claim 19, wherein selecting an eviction target is in accordance with a cache eviction policy.

21. The medium of claim 19, further comprising:

conditionally retaining the first application in the volatile memory, for responding to a future request, when criteria, including at least predefined usage level criteria, are met by the first application, and otherwise removing the first application from volatile memory upon returning the result responsive to the first received request.

22. The medium of claim 20, wherein the cache eviction policy includes a least-recently-used eviction policy.

23. The medium of claim 22, wherein only least recently used applications that are not pinned to the cache are eligible to be an eviction target.

24. The medium of claim 20, wherein the cache eviction policy includes a least-frequently-used eviction policy.

25. The medium of claim 24, wherein only least frequently used applications that are not pinned to the cache are eligible to be an eviction target.

26. The medium of claim 19, wherein each of the first plurality of applications comprises an executable application distributed to the server by an application master.

27. The medium of claim 19, further comprising:

receiving a second request to execute a second application that is exempt from eviction from the volatile memory, and in response:

determining that the second application is in the volatile memory; and executing the second application, and returning a result responsive to the second received request.

28. A method of operating a plurality of application servers and an application master in an application execution system, the method comprising:

at the application master:

storing a plurality of applications in a library for distribution among the application servers;

associating with each respective application a respective minimum cached instances requirement that specifies a number of instances of the respective application that are exempt from cache eviction;

distributing applications from the library to the application servers for storage in a non-volatile memory in each of the application servers;

monitoring the application servers to generate usage information for each of the applications in the library for a predefined period of time ending at a current time; and removing previously distributed applications from the non-volatile memory of respective application servers in accordance with the usage information for each of the applications in the library;

wherein the distributing includes distributing a respective application to a respective number of the application servers determined by the application master in accordance with the usage information for each of the applications in the library and the minimum cached instances requirement for the respective application, and allocating instances of the respective application that are exempt from cache eviction among the application servers; and at a respective application server of the plurality of application servers:

storing in non-volatile memory applications distributed to the application server;

when a first respective application has an allocated minimum cached instances requirement greater than zero, loading an instance of the first respective application into volatile memory and designating the instance as exempt from cache eviction; and when a second respective application has an allocated minimum cached instances requirement equal to zero:

loading the second respective application into volatile memory, executing the second respective application in response to a received request, and returning a result responsive to the request; and conditionally retaining the second respective application in volatile memory, for responding to a future request, when criteria, including at least predefined usage level criteria, are met by the second respective application, and otherwise removing the second respective application from volatile memory upon returning the result responsive to the request.

29. The method of claim 28, further comprising at the respective application server:

receiving a first request to execute a first application distributed to the application server, wherein the first application is not currently loaded in volatile memory, and in response:

determining that there is inadequate storage space in volatile memory to store the first application;

selecting from among application instances in volatile memory an eviction target, wherein the selecting excludes one or more application instances designated as exempt from cache eviction;

evicting from volatile memory the eviction target; and loading and executing the first application in response to the first received request, and returning a result responsive to the first received request.

30. The method of claim 28, wherein the volatile memory of each application server is managed in accordance with a cache eviction policy.

31. The method of claim 30, wherein the cache eviction policy includes a least-recently-used eviction policy.

32. The method of claim 30, wherein the cache eviction policy includes a least-frequently-used eviction policy.

* * * * *